(12) United States Patent
Suzuki et al.

(10) Patent No.: US 12,018,757 B2
(45) Date of Patent: Jun. 25, 2024

(54) SLIDING COMPONENTS

(71) Applicant: Eagle Industry Co., Ltd., Tokyo (JP)

(72) Inventors: Hiroshi Suzuki, Tokyo (JP); Yuichiro Tokunaga, Tokyo (JP); Yuta Negishi, Tokyo (JP); Hiroki Inoue, Tokyo (JP); Shogo Fukuda, Tokyo (JP); Wataru Kimura, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 258 days.

(21) Appl. No.: 17/420,660

(22) PCT Filed: Dec. 6, 2019

(86) PCT No.: PCT/JP2019/047890
§ 371 (c)(1),
(2) Date: Jul. 2, 2021

(87) PCT Pub. No.: WO2020/162025
PCT Pub. Date: Aug. 13, 2020

(65) Prior Publication Data
US 2022/0099191 A1    Mar. 31, 2022

(30) Foreign Application Priority Data

Feb. 4, 2019 (JP) .................................. 2019-017877

(51) Int. Cl.
*F16J 15/34* (2006.01)
*F16C 17/04* (2006.01)

(52) U.S. Cl.
CPC ......... *F16J 15/3416* (2013.01); *F16C 17/045* (2013.01)

(58) Field of Classification Search
CPC ............................ F16C 17/045; F16J 15/3416
See application file for complete search history.

(56) References Cited

U.S. PATENT DOCUMENTS

| 3,085,808 A | 4/1963 | Williams | 277/388 |
| 3,232,680 A | 2/1966 | Clark | 384/110 |
| 3,410,565 A | 11/1968 | Williams | 277/348 |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Chinese Office Action issued in application No. 201980087670.2 (with translation), dated Jul. 1, 2022 (17 pgs).

(Continued)

*Primary Examiner* — Eugene G Byrd
(74) *Attorney, Agent, or Firm* — HAYES SOLOWAY P.C.

(57) ABSTRACT

A sliding surface of the sliding component is provided with a communication groove having a start point communicating with a sealed fluid side in a radial direction, a storage groove communicating with the communication groove, and a plurality of dynamic pressure generation grooves generating a dynamic pressure at end points thereof upon a run of the rotating machine and the dynamic pressure generation grooves are located on a side of the sealed fluid side space with respect to the storage groove in the radial direction.

23 Claims, 14 Drawing Sheets

(56) References Cited

U.S. PATENT DOCUMENTS

| | | | |
|---|---|---|---|
| 3,466,052 A | 9/1969 | Ludwig | |
| 3,499,653 A | 3/1970 | Gardner | 277/27 |
| 3,527,465 A * | 9/1970 | Guinard | F04C 15/0038 |
| | | | 277/400 |
| 3,656,227 A | 4/1972 | Weinand | 29/530 |
| 3,675,935 A | 7/1972 | Ludwig | F16J 15/342 |
| 3,782,737 A | 1/1974 | Ludwig | |
| 3,804,424 A | 4/1974 | Gardner | 277/27 |
| 3,855,624 A * | 12/1974 | Reinhoudt | F16C 17/045 |
| 3,870,382 A * | 3/1975 | Reinhoudt | F16C 17/045 |
| | | | 384/123 |
| 4,406,466 A | 9/1983 | Geary, Jr. | 277/347 |
| 4,486,026 A | 12/1984 | Furumura et al. | 277/80 |
| 4,523,764 A | 6/1985 | Albers | F16J 15/342 |
| 4,645,414 A | 2/1987 | DeHart | F04D 17/161 |
| 5,092,612 A | 3/1992 | Victor | 277/400 |
| 5,133,562 A | 7/1992 | Lipschitz | F16J 15/342 |
| 5,201,531 A * | 4/1993 | Lai | F16J 15/3412 |
| | | | 277/400 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,044,470 B2 | 5/2006 | Zheng | F16J 15/342 |
| 7,510,330 B2 | 3/2009 | Obara | F16C 32/06 |
| 7,568,839 B2 | 8/2009 | Gotoh et al. | F16C 32/06 |
| 7,744,094 B2 | 6/2010 | Yanagisawa | F16J 15/342 |
| 7,758,051 B2 | 7/2010 | Roberts-Haritonov et al. | |
| | | | F16J 15/34 |
| 7,780,399 B1 * | 8/2010 | Garrison | F01D 25/183 |
| | | | 277/400 |
| 8,162,322 B2 * | 4/2012 | Flaherty | F16J 15/3412 |
| | | | 277/400 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 * | 3/2017 | Itadani | F16J 15/348 |
| 9,611,938 B1 | 4/2017 | Itadani | F16J 15/3416 |
| 9,677,670 B2 | 6/2017 | Itadani et al. | F16J 15/34 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,560 B2 | 7/2019 | Takunaga | F16C 33/80 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/34 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/447 |
| 11,603,934 B2 | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0135714 A1 | 6/2005 | Rahman | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 * | 5/2006 | Han | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2014/0203517 A1 | 7/2014 | Ferris | F16K 15/3412 |
| 2015/0115537 A1 | 4/2015 | Tokunaga | F16J 15/34 |
| 2015/0115540 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0003361 A1 | 1/2016 | Takahashi | F16J 15/3408 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0114902 A1 | 4/2017 | Itadani | F16J 15/3412 |
| 2017/0130844 A1 | 5/2017 | Itadani | F16J 15/3412 |
| 2017/0167615 A1 | 6/2017 | Itadani | F16J 15/3412 |
| 2017/0198814 A1 | 7/2017 | Colombo et al. | F16J 15/3412 |
| 2017/0234431 A1 | 8/2017 | Katori et al. | F16J 15/3412 |
| 2017/0241549 A1 | 8/2017 | Itadani | F16J 15/40 |
| 2018/0051809 A1 | 2/2018 | Yoshida | F16J 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2018/0135699 A1 | 5/2018 | Takunaga | F16J 15/348 |
| 2018/0195618 A1 | 7/2018 | Itadani | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 * | 12/2019 | Kimura | F16C 33/743 |
| 2020/0182299 A1 * | 6/2020 | Kimura | F16C 17/026 |
| 2021/0054935 A1 * | 2/2021 | Kimura | F16J 15/3412 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | F16J 15/3412 |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0099191 A1 | 3/2022 | Suzuki | F16C 33/103 |
| 2022/0145992 A1 | 5/2022 | Miyazaki | F16C 33/107 |
| 2022/0275828 A1 | 9/2022 | Inoue | F16J 15/3424 |
| 2023/0258184 A1 | 8/2023 | Suzuki | F04C 29/00 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |

(56) References Cited

FOREIGN PATENT DOCUMENTS

| | | | |
|---|---|---|---|
| CN | 104019237 | 9/2014 | ............... F16J 15/16 |
| CN | 104165229 | 11/2014 | ............... F16J 15/40 |
| CN | 105683632 | 6/2016 | ............... F04D 29/10 |
| CN | 106439037 | 2/2017 | ............... F16J 15/34 |
| CN | 206017723 | 3/2017 | ............... F16J 15/16 |
| CN | 107166036 | 9/2017 | ............... F16J 15/16 |
| CN | 107532724 | 1/2018 | ............... F16J 15/34 |
| CN | 107676484 | 2/2018 | ............ F16J 15/323 |
| CN | 108506494 | 9/2018 | ............... F16J 15/34 |
| DE | 36 19 489 | 12/1987 | ............... F16J 15/34 |
| DE | 4407453 | 9/1995 | ............... F16C 17/08 |
| EP | 0637706 | 8/1993 | ............... F16J 15/34 |
| EP | 0896163 | 2/1999 | ............. F16C 33/10 |
| EP | 2520835 | 11/2012 | ............... F16J 15/34 |
| EP | 2626604 | 8/2013 | ............... F16J 15/34 |
| EP | 2977655 | 1/2016 | ............... F16J 15/34 |
| EP | 3091258 | 11/2016 | ............... F16J 15/34 |
| EP | 3299686 | 3/2018 | ............... F16J 15/34 |
| EP | 3514414 | 7/2019 | ............... F16J 15/34 |
| EP | 3922872 | 12/2021 | ............... F16J 15/34 |
| EP | 3926187 | 12/2021 | ............... F16C 17/04 |
| EP | 3926188 | 12/2021 | ............... F16C 17/04 |
| EP | 3943765 | 1/2022 | ............... F16C 17/04 |
| GB | 1509482 | 5/1978 | ............. F16C 33/10 |
| JP | 36-6305 | 5/1961 | |
| JP | S49-33614 | 9/1974 | ............... F16J 15/34 |
| JP | S54-77305 | 6/1979 | ................ B06B 9/10 |
| JP | S55-177549 | 12/1980 | ............... F16J 15/16 |
| JP | S57-146955 | 9/1982 | ............... F16J 15/34 |
| JP | 58-109771 | 6/1983 | ............... F16J 15/34 |
| JP | 58-137667 | 8/1983 | ............... F16J 15/40 |
| JP | S59-58252 | 4/1984 | ............... F16J 15/34 |
| JP | S60-107461 | 7/1985 | ............. B63H 23/36 |
| JP | S6182177 | 5/1986 | ............... F16J 15/34 |
| JP | S62-37572 | 2/1987 | ............... F16J 51/34 |
| JP | S63-033027 | 3/1988 | ............. F16C 33/46 |
| JP | S63-190975 | 8/1988 | ............... F16J 15/34 |
| JP | H01133572 | 9/1989 | ............... F16J 15/34 |
| JP | 2-236067 | 9/1990 | ............... F16J 15/34 |
| JP | 3-14371 | 2/1991 | ............... F16J 15/34 |
| JP | 3-35372 | 4/1991 | ............... F16J 15/34 |
| JP | 3-41267 | 4/1991 | ............... F16J 15/34 |
| JP | 3-41268 | 4/1991 | ............... F16J 15/34 |
| JP | H04-73 | 1/1992 | ............... F16J 15/34 |
| JP | H04-145267 | 5/1992 | ............... F16J 15/34 |
| JP | H04-96671 | 8/1992 | ............... F16J 15/34 |
| JP | H05-90048 | 12/1993 | ............... F16J 15/34 |
| JP | H05-322050 | 12/1993 | ............... F16J 15/34 |
| JP | H07-55016 | 3/1995 | ............... F16J 15/34 |
| JP | H08-89489 | 4/1996 | ................. A61B 5/05 |
| JP | H09-503276 | 3/1997 | ............... F16J 15/34 |
| JP | H09-329247 | 12/1997 | ............... F16J 15/34 |
| JP | H10-38093 | 2/1998 | ............... F16J 15/34 |
| JP | H10-281299 | 10/1998 | ............... F16J 15/34 |
| JP | 2000-179543 | 6/2000 | ............. F16C 17/10 |
| JP | 2001-295833 | 10/2001 | ............. F16C 17/04 |
| JP | 2001-317638 | 11/2001 | ............... F16J 15/34 |
| JP | 2003-161322 | 6/2003 | ............. F16C 33/10 |
| JP | 2003-343741 | 12/2003 | ............... F16J 15/34 |
| JP | 2004-003578 | 1/2004 | ............... F16J 15/34 |
| JP | 2005-188651 | 7/2005 | ............... F16J 15/34 |
| JP | 2005-58051 | 12/2005 | ............. F16C 33/74 |
| JP | 2006-9828 | 1/2006 | ............. F16C 17/02 |
| JP | 2006-022834 | 1/2006 | ............... F16J 15/34 |
| JP | 2006-77899 | 3/2006 | ............... F16J 15/34 |
| JP | 2008-144864 | 6/2008 | ............. F16C 33/10 |
| JP | 2009-250378 | 10/2009 | ............... F16J 15/34 |
| JP | 2010-133496 | 6/2010 | ............... F16J 15/34 |
| JP | 2010-216587 | 9/2010 | ............... F16J 15/34 |
| JP | 2011-185292 | 9/2011 | ............... F16J 15/34 |
| JP | 2011196429 | 10/2011 | ............... F16J 15/34 |
| JP | 2011196429 A * | 10/2011 | |
| JP | 2012-2295 | 1/2012 | ............... F16J 15/34 |
| JP | 5271858 | 5/2013 | ............... F16J 15/34 |
| JP | 2016-80090 | 5/2016 | ............... F16J 15/34 |
| JP | 2017-141961 | 8/2017 | ............... F16J 15/34 |
| JP | 6444492 | 12/2018 | ............... F16J 15/34 |
| JP | 2019-15401 | 1/2019 | ............... F16J 15/34 |
| JP | 201913446 | 1/2019 | ............... A47J 27/00 |
| JP | 2019013446 A * | 1/2019 | |
| WO | WO 95/06832 | 3/1995 | ............... F16J 15/34 |
| WO | WO 2012/046749 | 4/2012 | ............... F16J 15/34 |
| WO | WO 2014/024742 | 2/2014 | ............... F16J 15/34 |
| WO | WO2014042045 | 3/2014 | ............. F16C 17/045 |
| WO | WO 2014/050920 | 4/2014 | ............... F16J 15/34 |
| WO | WO 2014/103630 | 7/2014 | ............... F16J 15/34 |
| WO | WO 2014/112455 | 7/2014 | ............... F16J 15/34 |
| WO | WO2014103631 | 7/2014 | ............... F16J 15/34 |
| WO | WO 2014/148316 | 9/2014 | ............... F16J 15/34 |
| WO | WO 2014/174725 | 10/2014 | ............... F16J 15/34 |
| WO | WO 2016/009408 | 1/2016 | ............... F16J 15/34 |
| WO | WO 2016/035860 | 3/2016 | ............... F16J 15/34 |
| WO | WO 2016/167262 | 10/2016 | ............... F16J 15/34 |
| WO | WO 2016/186019 | 11/2016 | ............... F16J 15/34 |
| WO | WO2016203878 | 12/2016 | ............... F16J 15/34 |
| WO | WO 2017/002774 | 1/2017 | ............... F16J 15/34 |
| WO | WO 2018/034197 | 2/2018 | ............... F16J 15/34 |
| WO | WO 2018/105505 | 6/2018 | ............... F16J 15/34 |
| WO | WO2018139231 | 8/2018 | ............... F16J 15/34 |
| WO | WO2018139232 | 8/2018 | ............. F16C 33/10 |

OTHER PUBLICATIONS

Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 9 (12 pgs).
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PCT/JP2019/038155, dated Nov. 19, 2019, with English translation, 18 pages.
U.S. Appl. No. 17/429,986, filed Aug. 10, 2021, Suzuki et al.

(56) References Cited

OTHER PUBLICATIONS

U.S. Appl. No. 17/603,561, filed Oct. 13, 2021, Imura et al.
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, dated Aug. 29, 2016, for Chinese counterpart application No. 201480002574.0, 8 pages.
First Notification of Reason for Refusal issued by the State Intellectual Property Office of China, dated Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.

International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
Chinese Office Action issued in application No. 201980059152.X (with translation), dated May 8, 2023, 11 pages.
European Search Report issued in application No. 20847261.3, dated Jul. 17, 2023, 8 pages.
Korean Official Action issued in Korean Patent Application Serial No. 10-2021-7028879, dated Jun. 28, 2023, 10 pages.
Official Action issued in related U.S. Appl. No. 17/428,909, dated Jul. 25, 2023, 8 pages.
Notice of Allowance issued in related U.S. Appl. No. 17/296,466, dated Jul. 24, 2023, 9 pages.
Chinese Office Action issued in application No. 201980065303.2 (with translation), dated Oct. 10, 2022 (13 pgs).
European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.
Chinese Office Action issued in application No. 201980076998.4 (with translation), dated Jan. 18, 2023, 12 pages.
Chinese Office Action issued in application No. 201980059152.X (with translation), dated Oct. 10, 2022, 14 pages.
Chinese Office Action issued in application No. 202080012994.2 (with translation), dated Feb. 2, 2023, 13 pages.
Chinese Office Action issued in application No. 202080012994.2 (with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.
European Official Action issued in application No. 22212136.0, dated Mar. 15, 2023, 8 pages.
European Official Action issued in application No. 19850900.2, dated Mar. 28, 2023, 4 pages.
European Official Action issued in application No. 23155551.7, dated Feb. 28, 2023, 7 pages.
European Official Action issued in application No. 19888532.9, dated Mar. 7, 2023, 3 pages.
European Official Action issued in application No. 23158438.4, dated May 15, 2023, 11 pages.
Japanese Decision of Refusal issued in application No. 2021-502065, dated May 23, 2023, 8 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Korean Official Action issued in Korean Patent Application Serial No. 10-2021-7016898, dated Feb. 16, 2023, 13 pages.
Official Action issued in related U.S. Appl. No. 17/413,466, dated Apr. 12, 2023, 11 pages.

(56) References Cited

OTHER PUBLICATIONS

Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
Official Action issued in related U.S. Appl. No. 17/628,158, dated May 15, 2023, 14 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
Official Action issued in related U.S. Appl. No. 17/275,505, dated Nov. 1, 2023, 7 pages.
Chinese Office Action issued in application No. 201980076998.4 (with translation), dated Sep. 29, 2023, 7 pages.
European Official Action issued in application No. 20759684.2, dated Sep. 25, 2023, 6 pages.
Korean Official Action issued in Korean Patent Application Serial No. 10-2021-7000686, dated Aug. 22, 2023, 6 pages with translation.
Official Action issued in related U.S. Appl. No. 17/277,282, dated Oct. 6, 2023, 8 pages.
Official Action issued in related U.S. Appl. No. 17/429,896, dated Oct. 10, 2023, 14 pages.
U.S. Appl. No. 17/257,260, filed Dec. 30, 2020, Okada.
U.S. Appl. No. 17/259,336, filed Jan. 11, 2021, Imura.
U.S. Appl. No. 17/275,505, filed Mar. 11, 2021, Tokunaga et al.
U.S. Appl. No. 17/277,282, filed Mar. 17, 2021, Tokunaga.
U.S. Appl. No. 17/296,466, filed May 24, 2021, Inoue et al.
U.S. Appl. No. 17/413,466, filed Jun. 11, 2021, Imura et al.
U.S. Appl. No. 17/428,909, filed Aug. 5, 2021, Tokunaga et al.
U.S. Appl. No. 17/429,896, filed Aug. 10, 2021, Suzuki et al.
U.S. Appl. No. 17/628,158, filed Jan. 18, 2022, Inoue et al.
Chinese Office Action issued in application No. 201980082245.4 (with translation), dated Aug. 3, 2023, 25 pages.
European Official Action issued in application No. 19876680.0, dated Aug. 24, 2023, 8 pages.
Korean Official Action issued in Korean Patent Application Serial No. 10-2022-7002564, dated Jun. 27, 2023, 11 pages with translation.
Korean Official Action issued in Korean Patent Application Serial No. 10-2021-7028347, dated Jun. 22, 2023, 11 pages with translation.
Korean Official Action issued in Korean Patent Application Serial No. 10-2021-7009776, dated Jun. 28, 2023, 8 pages with translation.
Official Action issued in related U.S. Appl. No. 17/420,660, dated Sep. 13, 2023, 10 pages.
Notice of Allowance issued in related U.S. Appl. No. 17/296,466, dated Jul. 24, 2023, 11 pages.
Notice of Allowance issued in related U.S. Appl. No. 17/259,336, dated Sep. 19, 2023, 8 pages.

* cited by examiner

SLIDING COMPONENTS

TECHNICAL FIELD

The present invention relates to relatively rotating sliding components, for example, sliding components used in a shaft sealing device axially sealing a rotation shaft of a rotating machine in an automobile, a general industrial machine, or other sealing fields or sliding components used in a bearing of a rotating machine in an automobile, a general industrial machine, and other bearing fields.

BACKGROUND ART

Conventionally, as a shaft sealing device that axially seals a rotation shaft of a rotating machine such as a pump or a turbine and prevents a leakage of a sealed fluid, there is known one including two components rotating relative to each other and configured so that planar end surfaces slide on each other, for example, a mechanical seal. The mechanical seal includes a stationary seal ring which is a sliding component fixed to a housing and a rotary seal ring which is a sliding component fixed to a rotation shaft and rotating together with the rotation shaft and a gap between the housing and the rotation shaft is axially sealed by relatively rotating their sliding surfaces.

In order to maintain a sealing property for a long period of time, such a mechanical seal needs to achieve the functions of "sealing" and "lubrication" at the same time. Particularly, in recent years, there has been an increasing demand even more for lower friction in order to reduce the energy lost due to sliding while preventing the leakage of the sealed fluid for environmental measures or the like. For example, as a method of reducing friction, there is known a method of forming a plurality of dynamic pressure generation grooves communicating with a leakage side of a sliding surface and a plurality of fluid introduction grooves communicating with a sealed fluid side, introducing a sealed fluid into the dynamic pressure generation grooves by relatively rotating two sliding components, generating a dynamic pressure at end points of the dynamic pressure generation grooves, and allowing the sliding surfaces to slide on each other with a fluid film interposed therebetween in a so-called fluid lubricating state so as to reduce the friction between the sliding components (for example, see Patent Citation 1).

CITATION LIST

Patent Literature

Patent Citation 1: JP 6444492 B2 (Page 12, FIG. 7)

SUMMARY OF INVENTION

Technical Problem

In this way, in Patent Citation 1, since the plurality of fluid introduction grooves communicating with the sealed fluid side space are formed, the sealed fluid can be easily introduced into the dynamic pressure generation grooves. Further, since the pressurized sealed fluid is supplied from the end points of these dynamic pressure generation grooves to a gap between the sliding components, the friction between the sliding components can be reduced. Meanwhile, since the sealed fluid introduced from the fluid introduction grooves at the time of driving the rotating machine leaks to the leakage side without being collected by the dynamic pressure generation grooves, there is a problem that the sealing property of the sliding components cannot be secured.

The present invention has been made in view of such problems and an object of the present invention is to provide sliding components capable of securing a sealing property while allowing a sliding surface to smoothly slide during rotation.

Solution to Problem

In order to solve the foregoing problems, sliding components according to of the present invention are sliding components formed in an annular shape and disposed at a relatively rotating part of a rotating machine, one of an inner diameter side space and an outer diameter side space of the sliding components being a sealed fluid side space in which a sealed fluid exists, remaining one of the inner diameter side space and the outer diameter side space being a leakage side space into which the sealed fluid is prevented from leaking, wherein a sliding surface of one of the sliding components is provided with a communication groove having a start point communicating with the sealed fluid side space in a radial direction, a storage groove communicating with the communication groove, and a plurality of dynamic pressure generation grooves configured for generating a dynamic pressure at end points thereof upon a run of the rotating machine, and wherein the dynamic pressure generation grooves are located on a side of the sealed fluid side space with respect to the storage groove in the radial direction. According to the aforesaid feature of the present invention, the sealed fluid introduced from the communication groove formed on the sliding surface is supplied to the storage groove communicating with the communication groove and the sliding surface can smoothly slide in combination with the dynamic pressure generation action by the dynamic pressure generation groove. Further, since the storage groove communicates with the sealed fluid side space which is the outside of the sliding components by the communication groove, it is possible to suppress the leakage of the sealed fluid to the leakage side space by returning the excessive sealed fluid to the sealed fluid side space and to secure the sealing property as the sliding components.

It may be preferable that the storage groove is formed in an endless annular shape in a circumferential direction of the sliding surface. According to this preferable configuration, it is possible to smoothly slide the sliding surface by equally distributing the sealed fluid introduced from the storage groove in the circumferential direction of the sliding surface and to collect the sealed fluid flowing between the sliding surfaces from the sealed fluid side toward the leakage side space.

It may be preferable that a plurality of the communication grooves are arranged in the circumferential direction of the sliding surface. According to this preferable configuration, the excessive sealed fluid can be efficiently returned from the plurality of communication grooves formed in the circumferential direction of the sliding surface to the sealed fluid side space.

It may be preferable that the communication groove and the dynamic pressure generation grooves have a curved shape which is inclined in a same direction. According to this preferable configuration, each of the communication groove and the dynamic pressure generation grooves can be formed at a plurality of positions by effectively using the space of the sliding surface. Accordingly, a smooth sliding operation can be equally performed in the circumferential direction and the excessive sealed fluid can be efficiently returned.

It may be preferable that the communication groove is configured for discharging the sealed fluid inside the communication groove toward the start point of the communication groove upon the run of the rotating machine. According to this preferable configuration, the excessive sealed fluid inside the communication groove can be easily discharged to the outside with the rotation of the rotating machine.

It may be preferable that the storage groove communicates with start points of the dynamic pressure generation grooves. According to this preferable configuration, since the sealed fluid introduced from the communication groove is guided to the dynamic pressure generation grooves when the rotating machine is stopped, a smooth sliding operation can be performed during low-speed rotation of the rotating machine.

It may be preferable that the sliding surface is further provided with a specific dynamic pressure generation groove communicating with a side of the start point of the communication groove in relation to start points of the dynamic pressure generation grooves configured for generating the dynamic pressure upon the run of the rotating machine. According to this preferable configuration, since the specific dynamic pressure generation groove is provided on the start point side of the communication groove in relation to the start points of the dynamic pressure generation grooves, a fluid lubricating operation can be reliably realized during low-speed rotation of the rotating machine. Further, since the specific dynamic pressure generation groove communicates with the communication groove, a fluid is not additionally supplied from the dynamic pressure generation grooves during high-speed rotation of the rotating machine and a high dynamic pressure is not generated.

It may be preferable that the sliding components constitute an inside type mechanical seal that seals a leakage of the sealed fluid in an inner radial direction. According to this preferable configuration, the excessive sealed fluid introduced from the communication groove can be effectively discharged to the space on the outer peripheral side by using a centrifugal force generated during high-speed rotation of the rotating machine.

It may be preferable that one of the sliding components having the sliding surface provided with the dynamic pressure generation grooves, the communication groove, and the storage groove is fixed to a rotation side member of the rotating machine. According to this preferable configuration, since there is a large influence of the centrifugal force on the sliding component fixed to the rotation side member of the rotating machine, the excessive sealed fluid that has entered the dynamic pressure generation grooves, the communication groove, and the storage groove can be efficiently discharged.

In addition, the sealed fluid may be a liquid or a mist in which a liquid and a gas are mixed.

DESCRIPTION OF EMBODIMENTS

Figure 1:
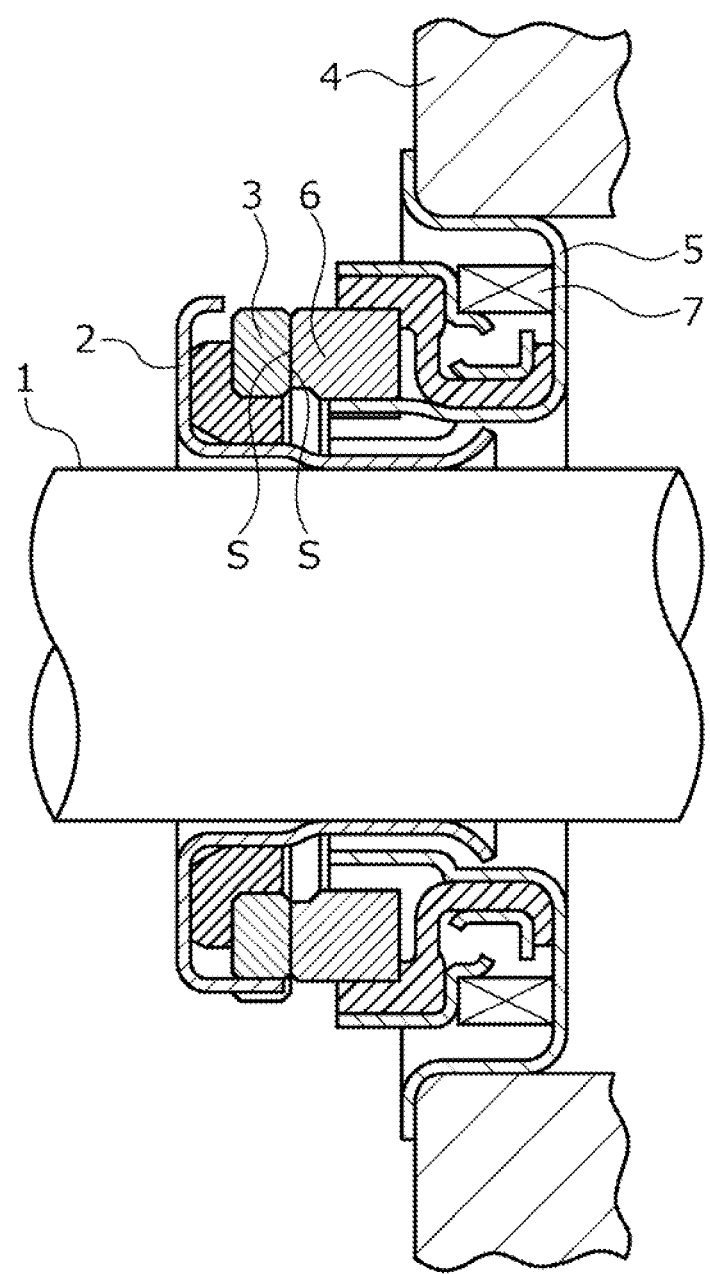
FIG. 1 is a cross-sectional view illustrating a structure of a rotating machine that uses a mechanical seal including sliding components according to a first embodiment of the present invention.

Modes for implementing sliding components according to the present invention will be described below based on embodiments.

First Embodiment

Sliding components according to a first embodiment will be described with reference to FIGS. 1 to 4.

The sliding components of the embodiment are, for example, a rotary seal ring 3 and a stationary seal ring 6 that constitute a mechanical seal which is a shaft sealing device for axially sealing a rotation shaft of a rotating machine in an automobile, a general industrial machine, or other sealing fields. Further, for convenience of description, dots are added to the grooves and the like formed on the sliding surface in the drawings.

As illustrated in FIG. 1, the annular rotary seal ring 3 which is provided on the side of a rotation shaft 1 through a sleeve 2 to rotate together with the rotation shaft 1 and the annular stationary seal ring 6 which is provided in a seal cover 5 fixed to a housing 4 of the rotating machine not to be rotatable and to be axially movable are formed such that their sliding surfaces S are in slidable contact with each other by urging means 7 for axially urging the stationary seal ring 6. That is, this mechanical seal is of an inside type that prevents a sealed fluid on an outer peripheral side which is a sealed fluid side of the sliding surface S from flowing out to an inner peripheral side which is a leakage side in the mutual sliding surfaces S between the rotary seal ring 3 and the stationary seal ring 6. In this embodiment, the sealed fluid is a high-pressure fluid such as a liquid or mist and a low-pressure fluid such as an atmosphere or dry gas exists in a space on the inner peripheral side of the mechanical seal.

The rotary seal ring 3 and the stationary seal ring 6 are typically formed of SiC (hard material) or a combination of SiC (an example of hard material) and carbon (an example of soft material), but a sliding material can be a sliding material used for a mechanical seal. As SiC, there are materials composed of two or more types of phases with different components and compositions, for example, SiC formed by dispersing graphite particles, reaction sintered SiC composed of SiC and Si, SiC-TiC, SiC-TiN, and the like, including sintered bodies using boron, aluminum, carbon, or the like as sintering aids. As carbon, carbon that is a mixture of carbon and graphite, resin molded carbon, sintered carbon, and the like can be used. Further, in addition to the sliding material, metal materials, resin materials, surface modification materials (or coating materials), composite materials, and the like can also be applied.

Figure 2:
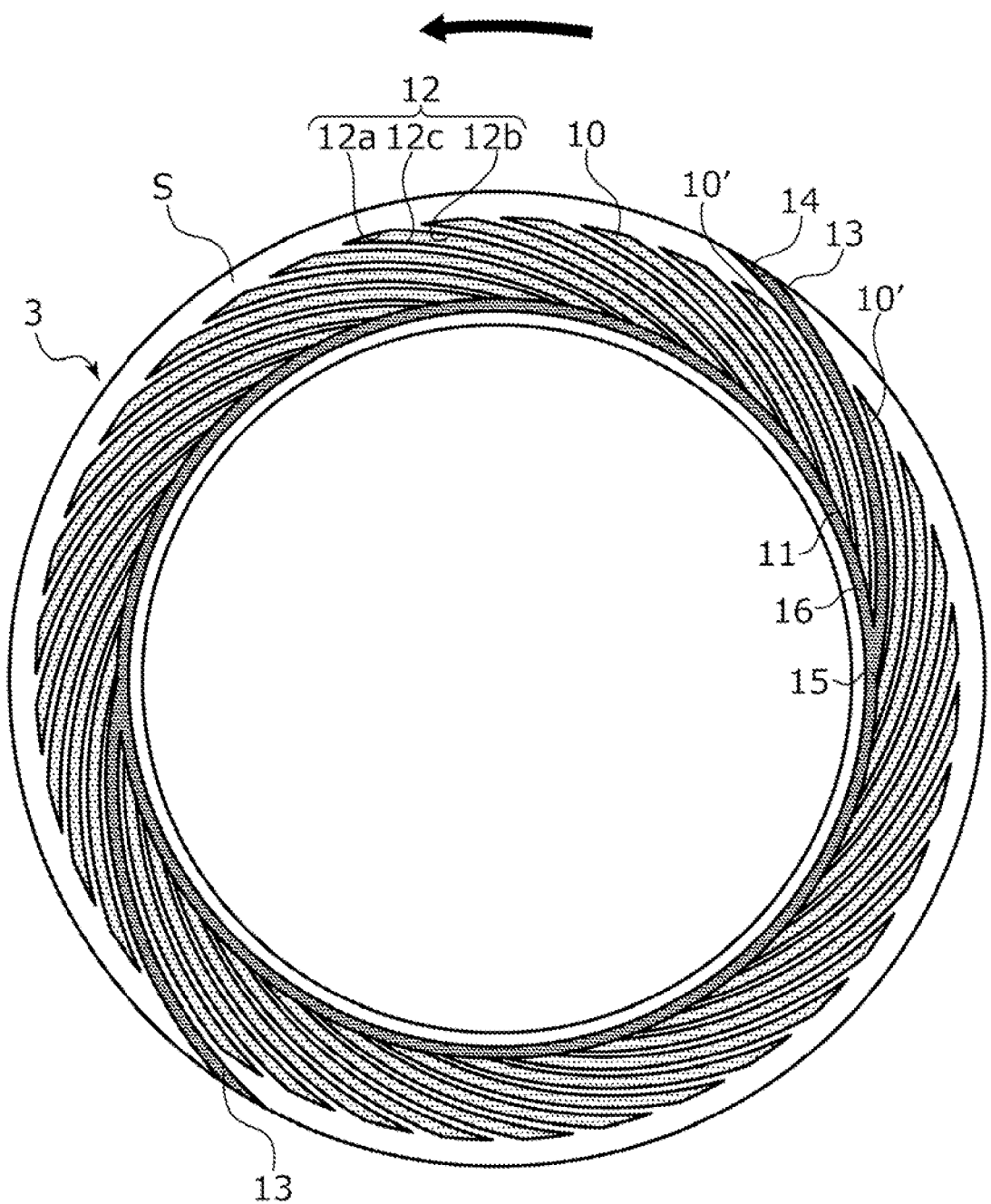
FIG. 2 is a diagram in which a stationary seal ring of the mechanical seal in the first embodiment is viewed from a sliding surface side.

As illustrated in FIG. 2, a plurality of dynamic pressure generation grooves 10 are formed on the sliding surface S of the rotary seal ring 3 so as to be arranged in the circumferential direction and be separated from each other in the circumferential direction. A total of thirty four dynamic pressure generation grooves 10 are formed in the circumferential direction and a predetermined number of (here, seventeen) dynamic pressure generation grooves are formed side by side with the same separation width in the circumferential direction. The dynamic pressure generation groove 10 is formed such that a start point 11 and an end point 12 are respectively located within the sliding surface S and is formed in a curved shape so as to be inclined in the rotational direction. Specifically, the dynamic pressure generation groove 10 has a curved shape including a component extending in the circumferential direction and a component extending in the radial direction. Among these, the component extending in the circumferential direction is formed to be larger and is formed to protrude toward the outer peripheral edge side of the stationary seal ring 6. The dynamic pressure generation groove 10 can be formed by subjecting the mirror-processed sliding surface S to fine processing such as laser processing or sandblasting. Further, the end point 12 of the dynamic pressure generation groove 10 is defined by a wall 12a which extends in a direction orthogonal to the sliding surface S while following the circumferential direction in the top view and walls 12b and 12c which extend in a direction orthogonal to the sliding surface S while being inclined and curved in the rotational direction in the top view and becomes a closed end.

Each communication groove 13 is formed between the dynamic pressure generation grooves 10' at both outermost ends of the predetermined number of (here, seventeen) dynamic pressure generation grooves 10. The communication groove 13 extends from a start point 14 which is communicable with a space on the outer peripheral side (that is, a high-pressure fluid side) to an end point 15 which communicates with a storage groove 16 to be described later on the inner peripheral side (that is, a low-pressure fluid side) of the rotary seal ring 3 and is formed by a groove having the same curvature as that of the dynamic pressure generation groove 10. Further, the communication groove 13 is formed side by side with the same circumferential separation width with respect to the adjacent dynamic pressure generation groove 10 and the next dynamic pressure generation groove 10. That is, thirty four dynamic pressure generation grooves 10 and two communication grooves 13 are equally arranged in the circumferential direction.

The endless annular storage groove 16 is formed on the inner radial side of the start point 11 of the dynamic pressure generation groove 10 and the start points 11 of all dynamic pressure generation grooves 10 and the end point 15 of the communication groove 13 respectively communicate with each other in the storage groove 16. The storage groove 16 is formed at the same depth as that of the communication groove 13 and the storage groove 16 and the communication groove 13 are formed to be deeper than the dynamic pressure generation groove 10. Additionally, the depth is a distance from the sliding surface S. Further, the storage groove 16 and the communication groove 13 may have different depths, but they are formed to be deeper than the dynamic pressure generation groove 10. In this way, since the communication groove 13 is deep, a sealed fluid can move between the sealed fluid side space and the storage groove 16 while passing through the communication groove 13 due to the static pressure regardless of the drive state of the rotating machine. Accordingly, as will be described later, when a large amount of a sealed fluid is introduced between the sliding surfaces at the time of driving the rotating machine, an excessive sealed fluid which is more than the amount that can be stored in the storage groove 16 is discharged from the communication groove 13 to the sealed fluid side space, that is, the outside.

In the sliding surface S, a portion not provided with the dynamic pressure generation groove 10, the communication groove 13, and the storage groove 16 is a land portion that forms a flat surface. Further, each of the dynamic pressure generation grooves 10, the communication groove 13, and the storage groove 16 has a U-shaped cross-sectional shape in which both side surfaces are orthogonal to a bottom surface and each bottom surface is parallel to the land portion. In addition, these bottom surfaces may be inclined with respect to the land portions and these cross-sectional shapes may be, for example, V shapes other than U shapes.

Next, an operation at the time of driving the rotating machine will be described with reference to FIGS. 3 and 4. In addition, arrows in FIGS. 2 to 4 indicate a relative rotational direction of the stationary seal ring 6 which is a mating sliding component.

Figure 3:
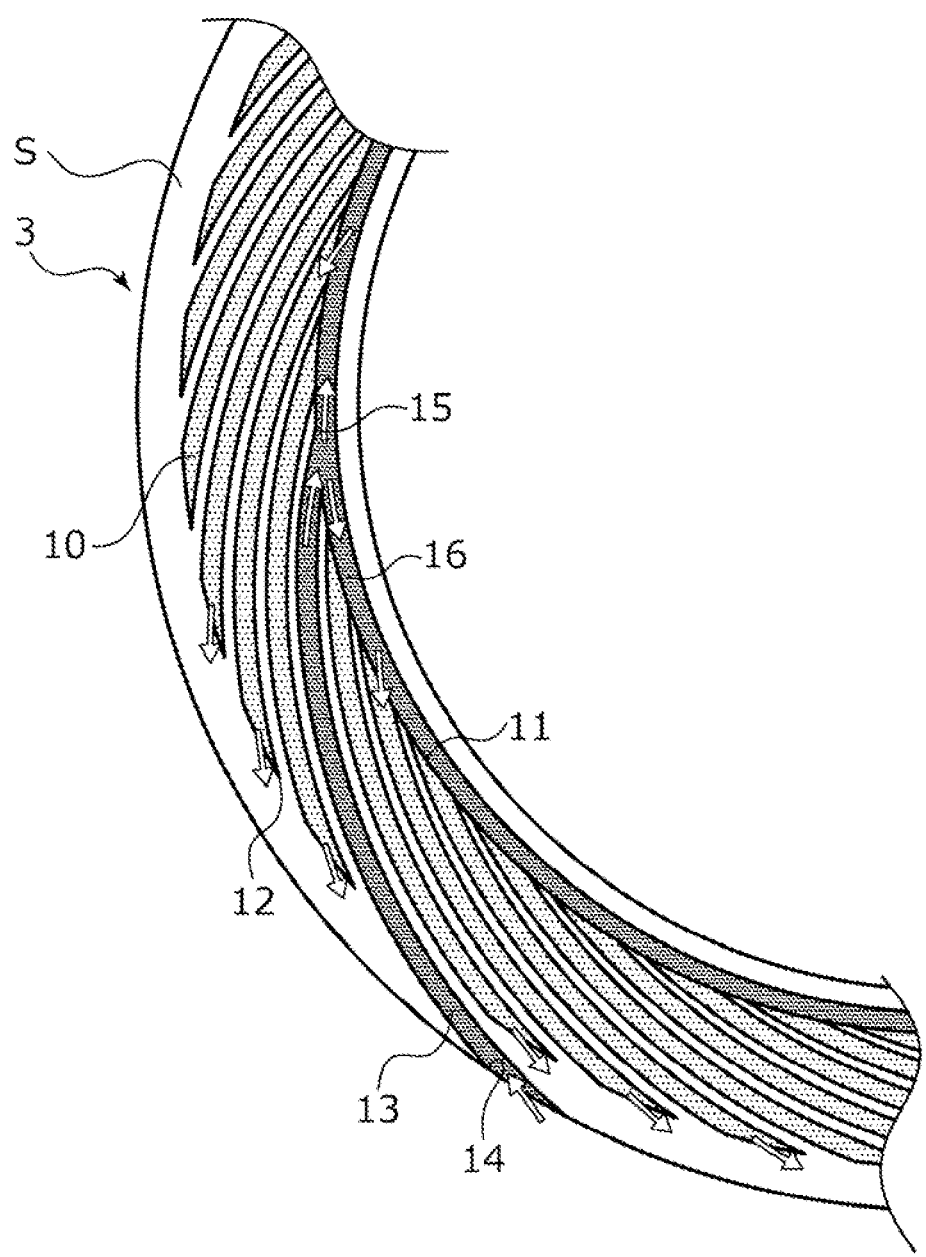
FIG. 3 is a conceptual diagram illustrating the movement of a fluid during extremely low-speed rotation of the rotating machine in the first embodiment.

FIG. 3 is a diagram illustrating a case of an extremely low-speed rotation state at the time of starting and restarting and a case of a stopped state. In an extremely low-speed rotation state or a stopped state, a high-pressure fluid is introduced from the communication groove 13 formed on the sliding surface S due to its fluid pressure, is further supplied to the storage groove 16 communicating with the communication groove 13, and is further supplied to the dynamic pressure generation groove 10 communicating with the storage groove 16. Then, at the time of extremely low-speed rotation, the high-pressure fluid inside the communication groove 13, the storage groove 16, and the dynamic pressure generation groove 10 moves while following the sliding surface S of the facing stationary seal ring 6 due to viscosity, the high-pressure fluid is mainly supplied from the end point 12 of the dynamic pressure generation groove 10 to a gap between the sliding surface S, and a fluid film is formed between these sliding surfaces S. Accordingly, it is possible to secure the lubricity of the sliding surface S during extremely low-speed rotation. Since the rotation speed is low during extremely low-speed rotation, the amount (that is, the discharge amount) of the high-pressure fluid discharged from the start point 14 of the storage groove 16 to the outside is small and the high-pressure fluid is a liquid and has high viscosity. Therefore, the fluid film is maintained and the fluid is lubricated. Further, since the storage groove 16 communicates with the outside of the stationary seal ring 6 (that is, an outer radial side space where a sealed fluid exists) by the communication groove 13, it is possible to suppress the leakage of the sealed fluid to the leakage side space by returning the sealed fluid which is the excessive high-pressure fluid to the sealed fluid side space and to secure the sealing property as the shaft sealing device.

Figure 4:
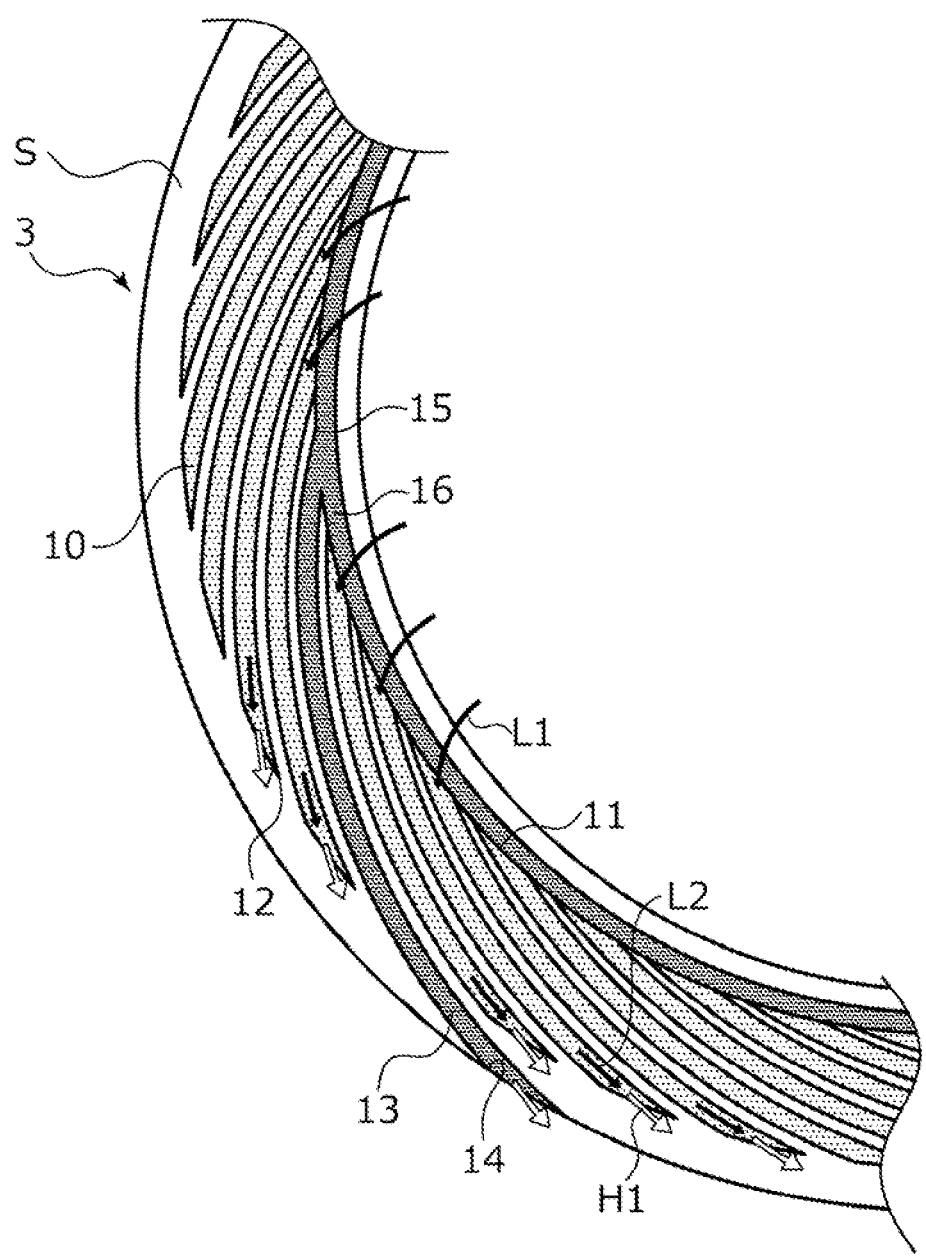
FIG. 4 is a conceptual diagram illustrating the movement of a fluid during high-speed rotation of the rotating machine in the first embodiment.

As illustrated in FIG. 4, when the rotating machine shifts to high-speed rotation where non-contact lubrication with a low-pressure fluid is suitable, a positive dynamic pressure generated in the end point 12 of the dynamic pressure generation groove 10 increases so that a gap between the sliding surfaces S increases slightly and a negative pressure is also generated in the start point 11 of the dynamic pressure generation groove 10. Due to this negative pressure, the low-pressure fluid is drawn from the inner periphery of the rotary seal ring 3 to the storage groove 16 or the start point 11 of the dynamic pressure generation groove 10 as indicated by an arrow L1. The low-pressure fluid which is drawn in this way can increase a pressure while flowing to the side of the end point 12 of the dynamic pressure generation groove 10 as indicated by an arrow L2. Further, the high-pressure fluid inside the dynamic pressure generation groove 10 is pushed out from the end point 12 into a gap between the sliding surfaces S as indicated by an arrow H1. Here, since the high-pressure fluid has high viscosity, the high-pressure fluid is promptly pushed out from the dynamic pressure generation groove 10 into a gap between the sliding surfaces S as a lump by the low-pressure fluid and then is promptly discharged to the outside of the rotary seal ring 3 by the pressurized low-pressure fluid leaking from the end point 12 of the dynamic pressure generation groove 10. Then, the dynamic pressure generation groove 10 generates a high pressure by the low-pressure fluid so that the rotary seal ring 3 and the stationary seal ring 6 are lubricated in a non-contact state while being separated from each other.

Further, since a positive dynamic pressure is relatively generated on the side of the start point 14 of the communication groove 13 and a negative pressure is generated on the inner radial side communicating with the storage groove 16 during high-speed rotation, the high-pressure fluid located inside the communication groove 13 is discharged to the outside of the rotary seal ring 3.

In this way, when the extremely low-speed rotation is shifted to the high-speed rotation, the high-pressure fluid is discharged so that the fluid lubrication is smoothly shifted to the non-contact lubrication in a short time.

Further, since the storage groove 16 into which the high-pressure fluid is introduced is located on the inner peripheral side of the dynamic pressure generation groove 10 (that is, the low-pressure fluid side), that is, the dynamic pressure generation groove 10 is located on the side of the start point 14 of the communication groove 13 in relation to the storage groove 16, the high-pressure fluid inside the storage groove 16 can be pushed out to the space on the high-pressure fluid side through the communication groove 13 by the movement of the low-pressure fluid in the outer radial direction (that is, toward the high-pressure fluid) and hence the fluid lubrication using the high-pressure fluid can be promptly shifted to the non-contact lubrication using the low-pressure fluid.

Further, since the storage groove 16 communicates with the start point 11 of the dynamic pressure generation groove 10, the high-pressure fluid inside the storage groove 16 passes through the dynamic pressure generation groove 10 and is pushed out from the end point 15 by the low-pressure fluid drawn from the dynamic pressure generation groove 10 to be effectively and promptly discharged to the space on the high-pressure fluid side during high-speed rotation of the rotating machine. Further, since the high-pressure fluid flows through the dynamic pressure generation groove 10 from the start point 11 to the end point 12, contamination that has entered the dynamic pressure generation groove 10 in which the end point 12 on the outer peripheral side (that is, the high-pressure fluid side) is closed can be washed away.

Further, since the wall 12a extending in a direction orthogonal to the sliding surface S of each dynamic pressure generation groove 10 is disposed in the circumferential direction, the high-pressure fluid can be equally discharged in the circumferential direction of the sliding surface S and hence the fluid lubrication can be shifted to the non-contact lubrication in a shorter time.

Further, since the communication groove 13 is formed to generate a dynamic pressure at the start point 14 and the vicinity thereof at the time of driving the rotating machine, the high-pressure fluid is not easily introduced into the communication groove 13 and is easily discharged from the communication groove 13 to the sealed fluid side space during high-speed rotation of the rotating machine.

Further, since the storage groove 16 is formed in an endless annular shape in the circumferential direction of the sliding surface S, it is possible to perform the lubrication by equally distributing the high-pressure fluid in the circumferential direction of the sliding surface S during extremely low-speed rotation and to effectively discharge the high-pressure fluid while equally distributing the high-pressure fluid in the circumferential direction during high-speed rotation.

Further, since the plurality of communication grooves 13 are formed in the circumferential direction of the sliding surface S, it is possible to promptly supply the high-pressure fluid from the plurality of communication grooves 13 formed in the circumferential direction of the sliding surface S over the circumferential direction of the storage groove 16. In addition, it is possible to efficiently return the excessive sealed fluid from the plurality of communication grooves 13 formed in the circumferential direction of the sliding surface S to the sealed fluid side space.

Further, since the communication groove 13 and the dynamic pressure generation groove 10 have a curved shape which is inclined in the same direction, it is possible to form each of the communication groove 13 and the dynamic pressure generation groove 10 at a plurality of positions by effectively using the space of the sliding surface S, to perform a lubricating operation equally in the circumferential direction during both extremely low-speed rotation and high-speed rotation, and to efficiently return the excessive sealed fluid.

Further, the rotary seal ring 3 which is the sliding component partially constitutes an inside type mechanical seal which seals the high-pressure fluid existing on the outer peripheral side in the inner circumferential direction. Accordingly, it is possible to effectively discharge the high-pressure fluid from the communication groove 13, the dynamic pressure generation groove 10, and the storage groove 16 to the outer peripheral side by using the centrifugal force generated during high-speed rotation of the rotating machine.

Further, since the dynamic pressure generation groove 10, the communication groove 13, and the storage groove 16 are formed in the rotary seal ring 3 fixed to the rotation shaft 1 and largely influenced by the centrifugal force, the high-pressure fluid that has entered the dynamic pressure generation groove 10, the communication groove 13, and the storage groove 16 can be efficiently discharged.

Additionally, in the embodiment, a case in which the dynamic pressure generation groove 10, the communication groove 13, and the storage groove 16 are formed in the rotary seal ring 3 has been described, but the present invention is not limited thereto. For example, these may be formed on the sliding surface S of the stationary seal ring 6 or may be formed on both the sliding surface S of the rotary seal ring 3 and the sliding surface S of the stationary seal ring 6.

Additionally, the dynamic pressure generation groove 10, the communication groove 13, and the storage groove 16 may be respectively and separately formed in different sliding components (that is, the rotary seal ring 3 and the stationary seal ring 6).

Additionally, the dynamic pressure generation groove 10 is not limited to the curved shape and may be, for example, a linear shape inclined in the circumferential direction and the radial direction or a shape in which a straight line is bent.

Additionally, since the communication groove 13 may have a shape in which the dynamic pressure is hard to occur on the side of the storage groove 16 (the low-pressure fluid side) at the time of driving the rotating machine, the communication groove may be formed in a linear shape extending in the radial direction.

Additionally, a case in which the sliding components constitutes the mechanical seal has been described as an example, but the present invention is not limited thereto. For example, the present invention can be used for a thrust bearing.

Additionally, a case in which the high-pressure fluid exists in the sealed fluid side space corresponding to the outer peripheral side of the sliding surface S and the low-pressure fluid exists in the leakage side space corresponding to the space on the inner peripheral side has been described as an example, but the present invention is not limited thereto. For example, the fluids existing in the leakage side space and the sealed fluid side space of the sliding surface S may have the same pressure and all of these may be a gas or a liquid. That is, as a conceivable aspect, for example, a configuration may be employed in which the communication groove 13 communicates with the leakage side space, the fluid of the leakage side space is introduced to the sliding surface S during extremely low-speed rotation, the sealed fluid of the sealed fluid side space is taken into the dynamic pressure generation groove 10 during high-speed rotation, and the dynamic pressure is generated in the end point 12. In this case, the storage groove 16 is located on the sealed fluid side in relation to the dynamic pressure generation groove 10 in the sliding surface S.

Additionally, in this embodiment, an example in which the non-contact lubrication described with reference to FIG. 4 is performed at the time of driving the rotating machine at the high-speed rotation has been described, but the present invention is not limited to the drive state or the lubrication state. Then, the dynamic pressure may be generated by the sealed fluid using the dynamic pressure generation groove 10 described with reference to at least FIG. 3. For example, the dynamic pressure may be generated by the sealed fluid using the dynamic pressure generation groove 10 described with reference to FIG. 3 at the time of driving the rotating machine at the high-speed rotation and the non-contact lubrication is not essential.

Second Embodiment

Next, sliding components according to a second embodiment of the present invention will be described with reference to FIGS. 5 to 7. Additionally, the same components as those shown in the above-described embodiment are denoted by the same reference numerals and redundant description will be omitted.

Figure 5:
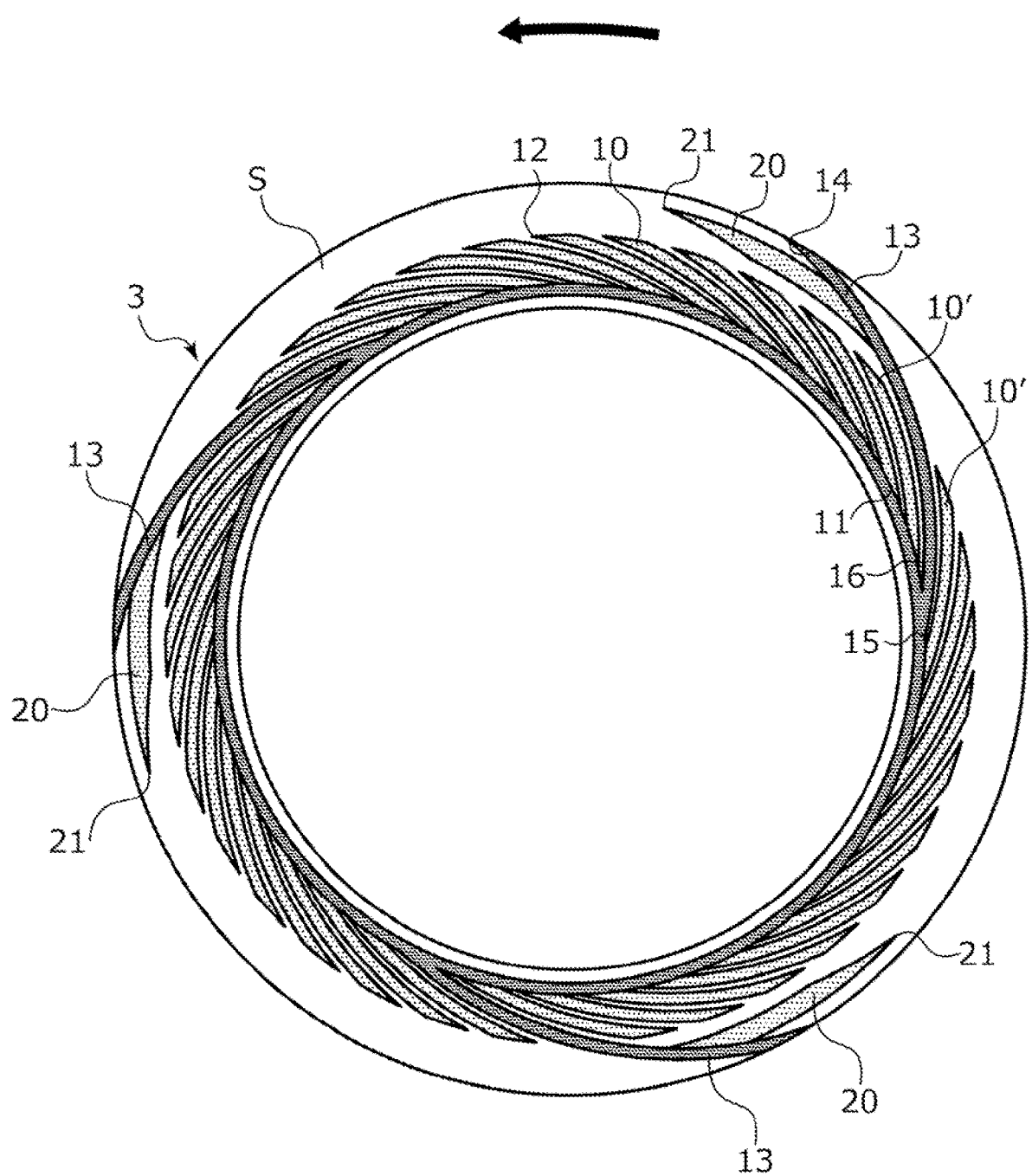
FIG. 5 is a diagram in which a stationary seal ring of sliding components according to a second embodiment of the present invention is viewed from a sliding surface side.

As illustrated in FIG. 5, a specific dynamic pressure generation groove 20 which generates a dynamic pressure at an end portion 21 in a high-pressure fluid at the time of driving the rotating machine communicates with the outer peripheral side (the high-pressure fluid side) in relation to the end point 12 of the dynamic pressure generation groove 10 in the communication groove 13 in the sliding surface S. The specific dynamic pressure generation groove 20 has a curved shape extending in the circumferential direction and is formed to be narrower toward the end point 21.

Figure 6:
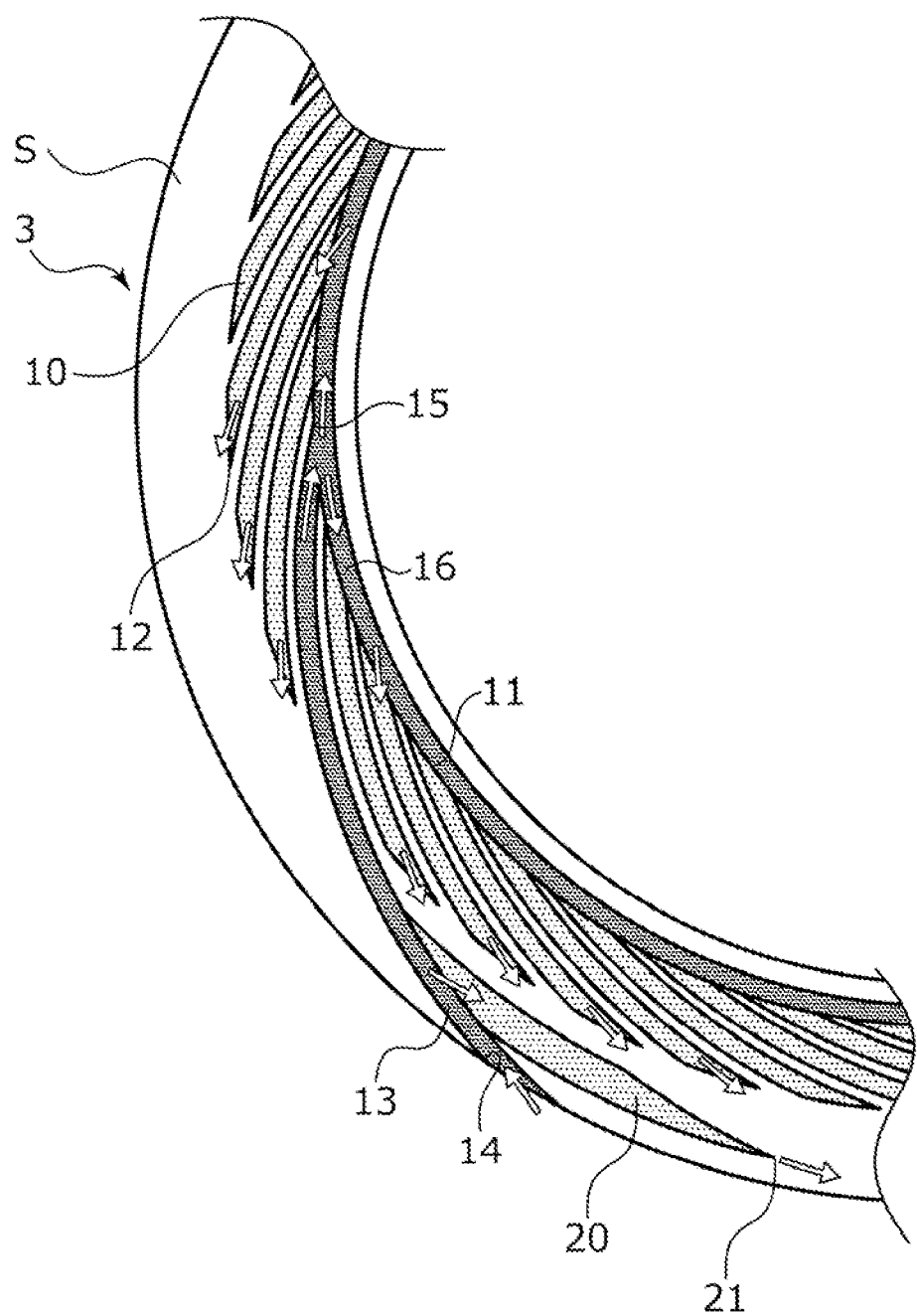
FIG. 6 is a conceptual diagram illustrating the movement of a fluid during extremely low-speed rotation of a rotating machine in the second embodiment.

Accordingly, even when the fluid pressure of the high-pressure fluid itself is not enough for forming an appropriate fluid film between the sliding surfaces S, the high-pressure fluid introduced from the communication groove 13 is moved to the end point of the specific dynamic pressure generation groove 20 and generates a dynamic pressure enough for forming a fluid film during low-speed rotation of the rotating machine as illustrated in FIG. 6.

Figure 7:
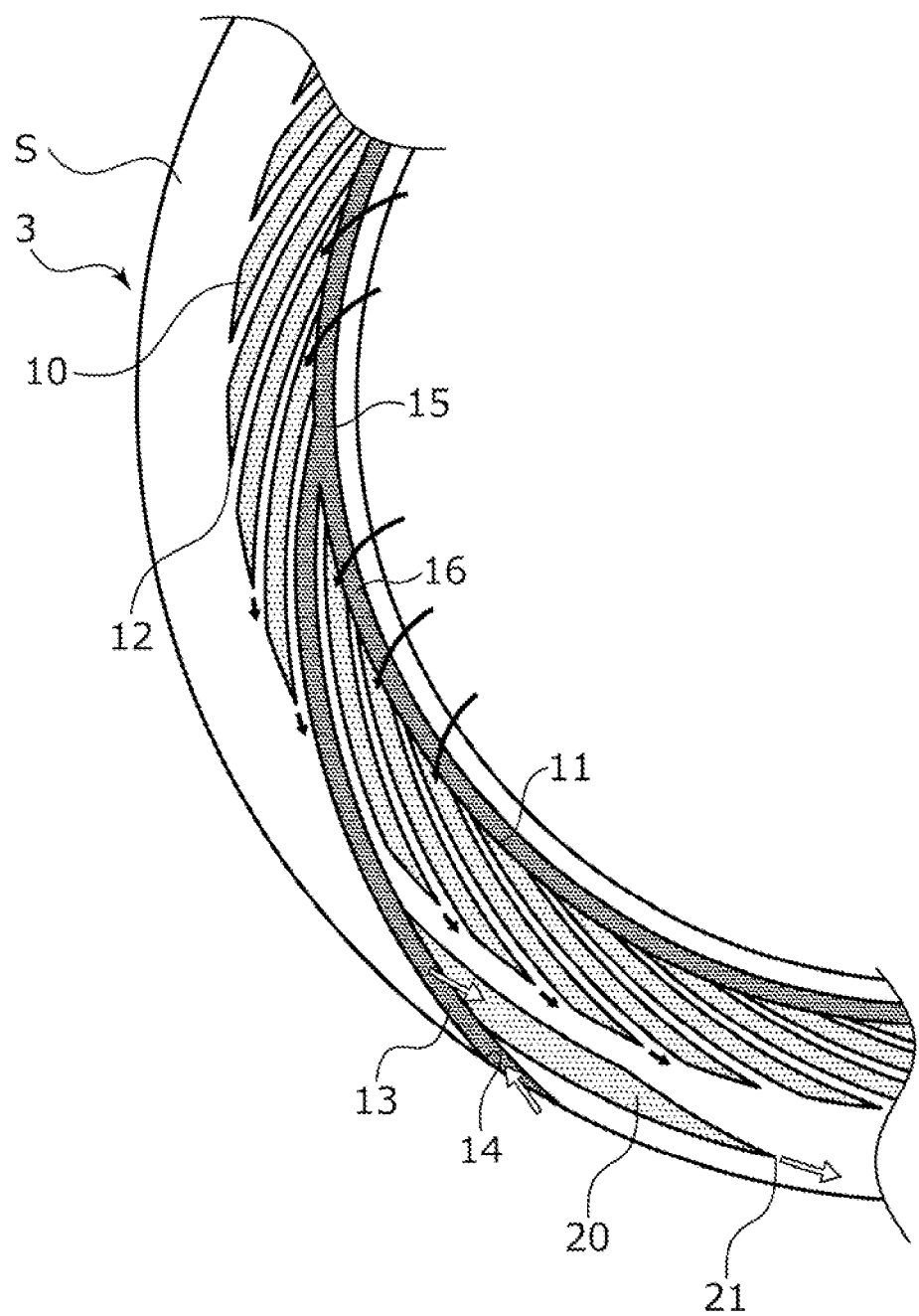
FIG. 7 is a conceptual diagram illustrating the movement of a fluid during low-speed rotation of the rotating machine in the second embodiment.

Further, since the number of the specific dynamic pressure generation grooves 20 for the high-pressure fluid is smaller than the number of the dynamic pressure generation grooves 10 for the low-pressure fluid, the fluid lubrication using the high-pressure fluid and the non-contact lubrication using the low-pressure fluid can exist together in the case of the low-speed operation before reaching the high-speed rotation of the rotating machine as illustrated in FIG. 7. Further, since the specific dynamic pressure generation groove 20 for the high-pressure fluid is formed on the outer radial side in the sliding surface S in relation to the end point 12 of the dynamic pressure generation groove 10, the fluid film formed by the high-pressure fluid concentrates on the outer peripheral side (the high-pressure fluid side). Accordingly, when the dynamic pressure of the low-pressure fluid during high-speed rotation can be sufficiently secured, the high-pressure fluid is pushed out from the inner peripheral side (the low-pressure fluid side) to the outer peripheral side and the fluid lubrication using the high-pressure fluid can be promptly shifted to the non-contact lubrication using the low-pressure fluid.

Third Embodiment

Next, sliding components according to a third embodiment of the present invention will be described with reference to FIG. 8. Additionally, the same components as those shown in the above-described embodiment are denoted by the same reference numerals and redundant description will be omitted.

Figure 8:
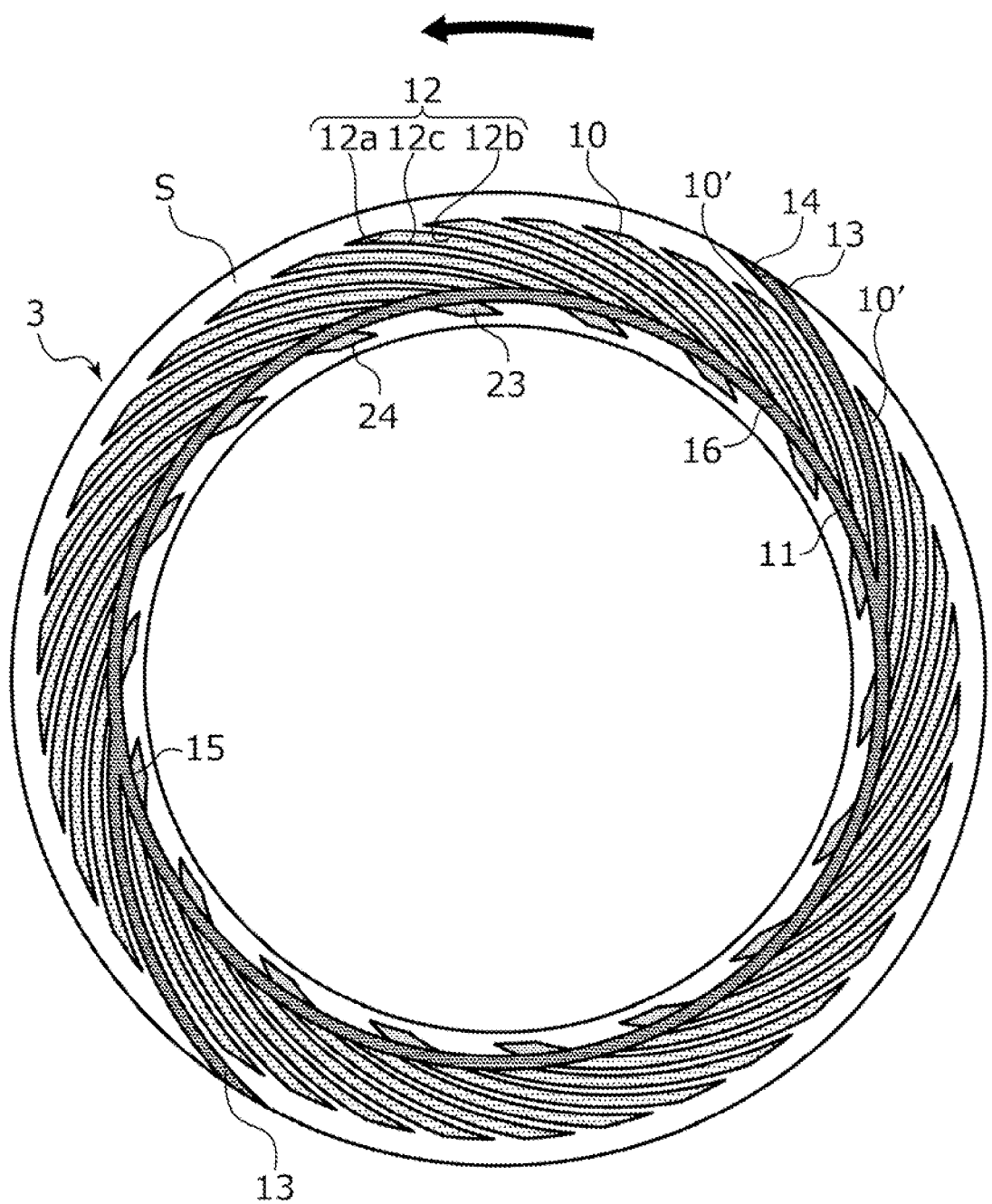
FIG. 8 is a diagram in which a stationary seal ring of sliding components according to a third embodiment of the present invention is viewed from a sliding surface side.

As illustrated in FIG. 8, a negative pressure generation groove 23 communicates with the inner peripheral side (that is, the low-pressure fluid side) of the storage groove 16 in the sliding surface S. The negative pressure generation groove 23 is a shallow groove which is formed to be shorter and deeper than the dynamic pressure generation groove 10 and to be shallower than the storage groove 16, is formed in a curved shape having the same curvature as that of the dynamic pressure generation groove 10 extending in the circumferential direction, and generates a negative pressure at the end point 24 on the inner peripheral side at the time of driving the rotating machine.

Accordingly, since the excessive sealed fluid which leaks to the inner peripheral side in the sliding surface S in relation to the storage groove 16 is collected to the storage groove 16 by the negative pressure generation groove 23, it is possible to suppress the leakage of the sealed fluid to the leakage side space and to secure the sealing property as the shaft sealing device. Further, since the negative pressure generation groove 23 is formed to be shorter and deeper than the dynamic pressure generation groove 10, the negative pressure generated in the end point 24 inside the negative pressure generation groove 23 is not larger than necessary while securing the capacity to temporarily store the excessive sealed fluid leaking from the storage groove 16 to the inner peripheral side and the sliding property is not disturbed.

Additionally, the low-pressure fluid on the inner peripheral side can be actively drawn to the storage groove 16 by the negative pressure generation groove 23 during high-speed rotation of the rotating machine, the dynamic pressure generated by the low-pressure fluid during high-speed rotation is promptly secured, and the fluid lubrication can be smoothly shifted to the non-contact lubrication in a short time.

Figure 9:
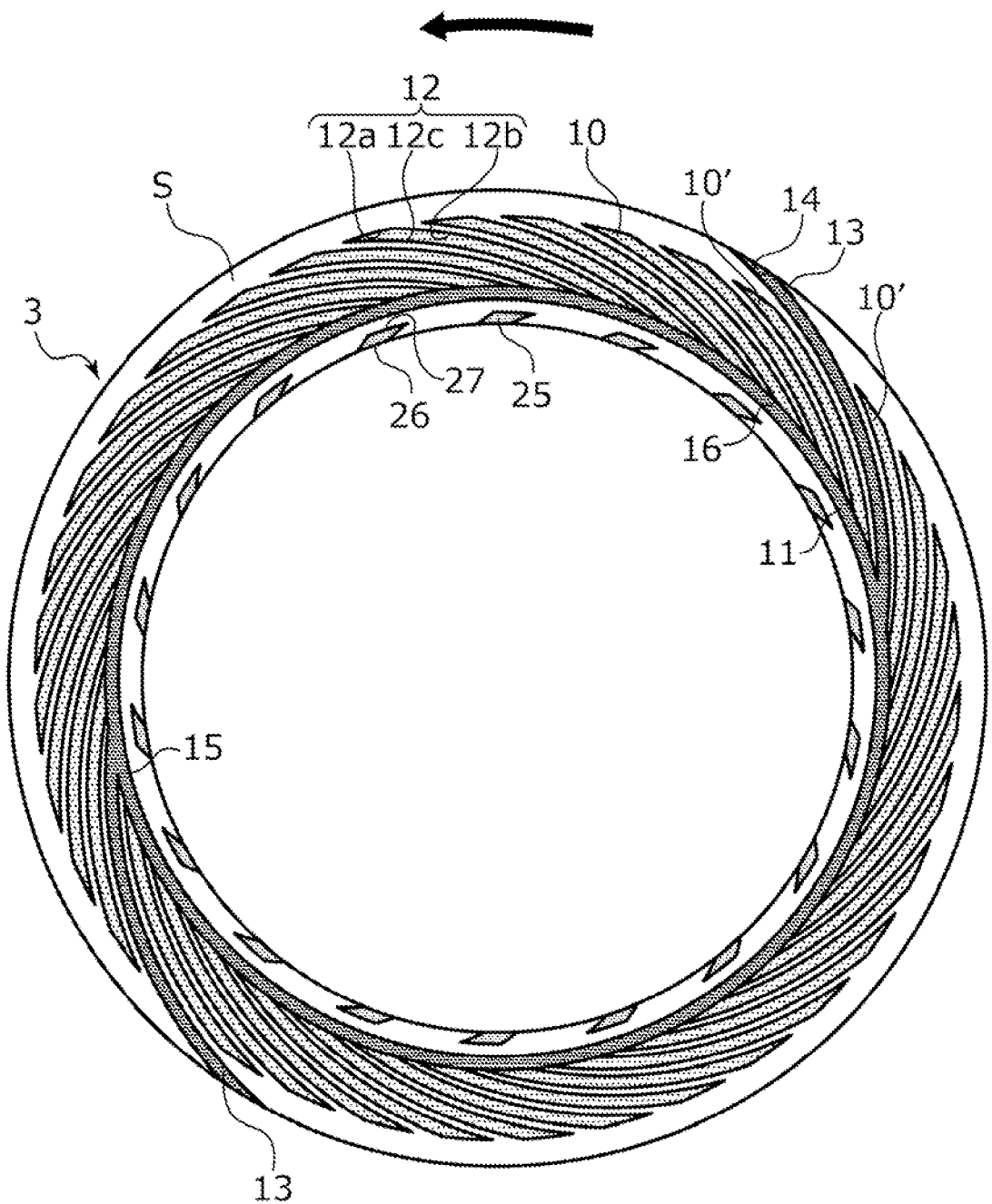
FIG. 9 is a diagram in which a stationary seal ring of a first modified example in the third embodiment is viewed from a sliding surface side.

FIG. 9 is a first modified example of the sliding components according to the third embodiment and a negative pressure generation groove 25 which opens to a space on the inner peripheral side (that is, a space on the low-pressure fluid side) and is separated from the storage groove 16 is formed on the inner peripheral side (that is, the low-pressure fluid side) in relation to the storage groove 16. The negative pressure generation groove 25 is a shallow groove which is formed to be shorter and deeper than the dynamic pressure generation groove 10 and to be shallower than the storage groove 16. Accordingly, since a negative pressure is generated in an end point 27 on the side of the storage groove 16 of the negative pressure generation groove 25 and the vicinity thereof during high-speed rotation of the rotating machine and a fluid in the vicinity thereof is drawn to the negative pressure generation groove 25 and is discharged to the space on the inner peripheral side, it is possible to prevent a fluid of the space on the inner peripheral side from entering the sliding surface.

Fourth Embodiment

Next, sliding components according to a fourth embodiment will be described with reference to FIG. 10. Additionally, the same components as those shown in the above-described embodiment are denoted by the same reference numerals and redundant description will be omitted.

Figure 10:
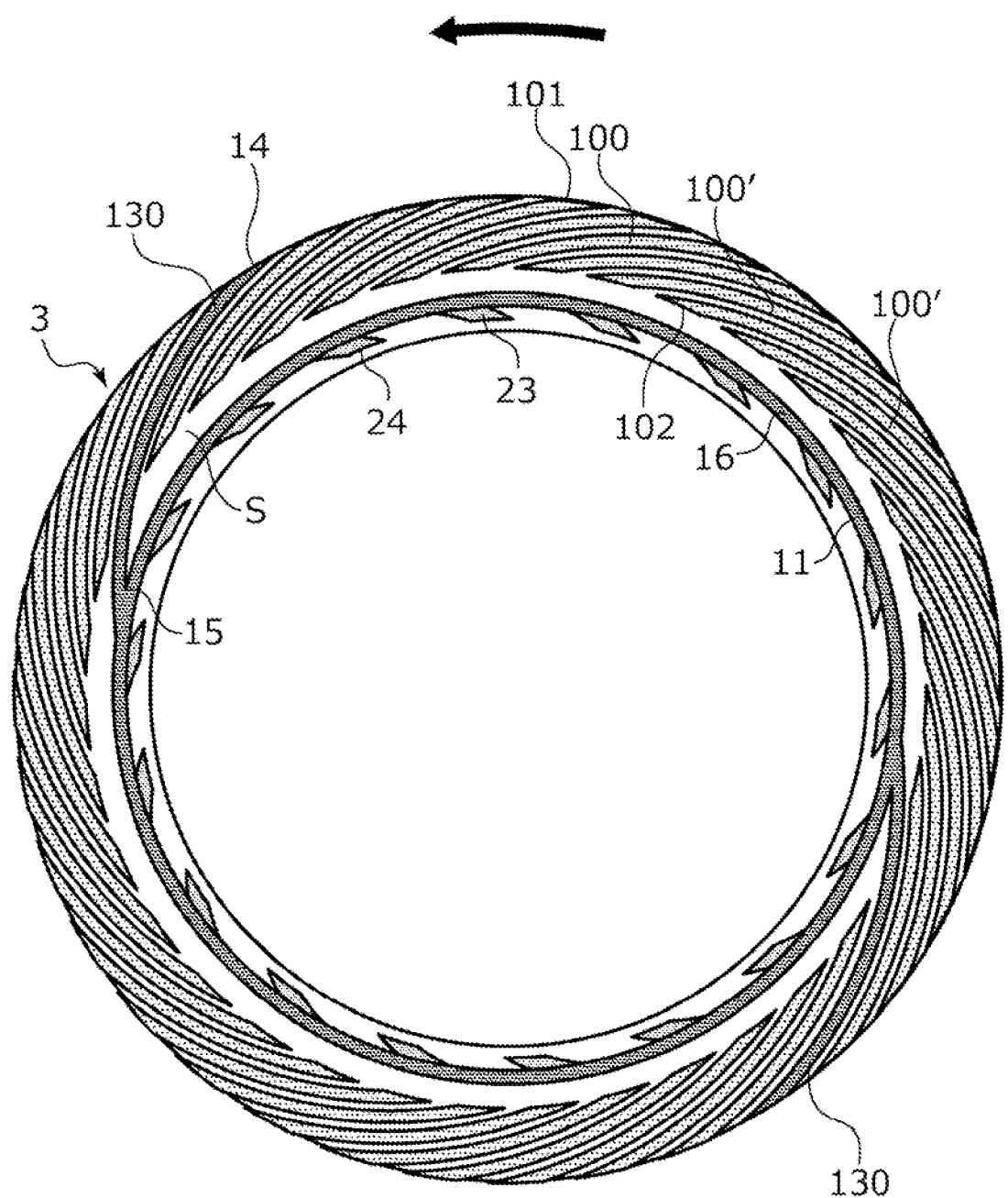
FIG. 10 is a diagram in which a stationary seal ring of sliding components according to a fourth embodiment of the present invention is viewed from a sliding surface side.

As illustrated in FIG. 10, the rotary seal ring 3 which is the sliding component is provided with a predetermined number of dynamic pressure generation grooves 100, a communication groove 130 formed between the dynamic pressure generation grooves 100' at both ends in the circumferential direction, and the storage groove 16. The dynamic pressure generation groove 100 includes a start point 101 which is opened to be communicable with the space on the outer peripheral side (that is, the high-pressure fluid side) and an end point 102 is a closed end and is disposed to be separated to the outer peripheral side in the radial direction in relation to the storage groove 16 formed in an annular shape on the inner peripheral side (that is, the low-pressure fluid side).

The communication groove 130 extends from the start point 14 opening on the outer peripheral side (that is, the high-pressure fluid side) to the end point 15 on the inner peripheral side (that is, the low-pressure fluid side) and is formed by a groove having the same curvature as that of the dynamic pressure generation groove 100. The communication groove 130 communicates with the storage groove 16 at the end point 15.

In a stopped state, the sealed fluid which is the high-pressure fluid is introduced from the communication groove 130 and the dynamic pressure generation groove 100 formed on the sliding surface S by the fluid pressure thereof and is further supplied to the storage groove 16 communicating with the communication groove 130. During rotation of the rotating machine, the sealed fluid inside the communication groove 130, the storage groove 16, and the dynamic pressure generation groove 100 moves due to viscosity while following the sliding surface S of the facing stationary seal ring 6 and the high-pressure fluid is mainly supplied from the end point 102 of the dynamic pressure generation groove 100 to a gap between the sliding surfaces S so that a fluid film is formed between the sliding surfaces S. Further, since the storage groove 16 communicates with the outside of the stationary seal ring 6 (that is, an outer radial side space where the sealed fluid exists) by the communication groove 130, it is possible to suppress the leakage of the sealed fluid to the leakage side by returning the excessive sealed fluid to the outside and to secure the sealing property as the shaft sealing device.

Further, the negative pressure generation groove 23 communicates with the inner peripheral side (that is, the low-pressure fluid side) of the storage groove 16 and the negative pressure is generated at the end point 24 on the inner peripheral side at the time of driving the rotating machine. Accordingly, since the excessive sealed fluid leaking from the storage groove 16 to the inner peripheral side is collected to the storage groove 16 by the negative pressure generation groove 23, it is possible to suppress the leakage of the sealed fluid to the leakage side space and to secure the sealing property as the shaft sealing device.

Further, since the communication groove 130 and the dynamic pressure generation groove 100 are formed to be inclined in the same direction, it is possible to form each of the communication groove 130 and the dynamic pressure generation groove 100 at a plurality of positions by effectively using the space of the sliding surface. Accordingly, it is possible to equally perform the smooth sliding operation in the circumferential direction and to efficiently return the excessive sealed fluid to the outside.

Figure 11:
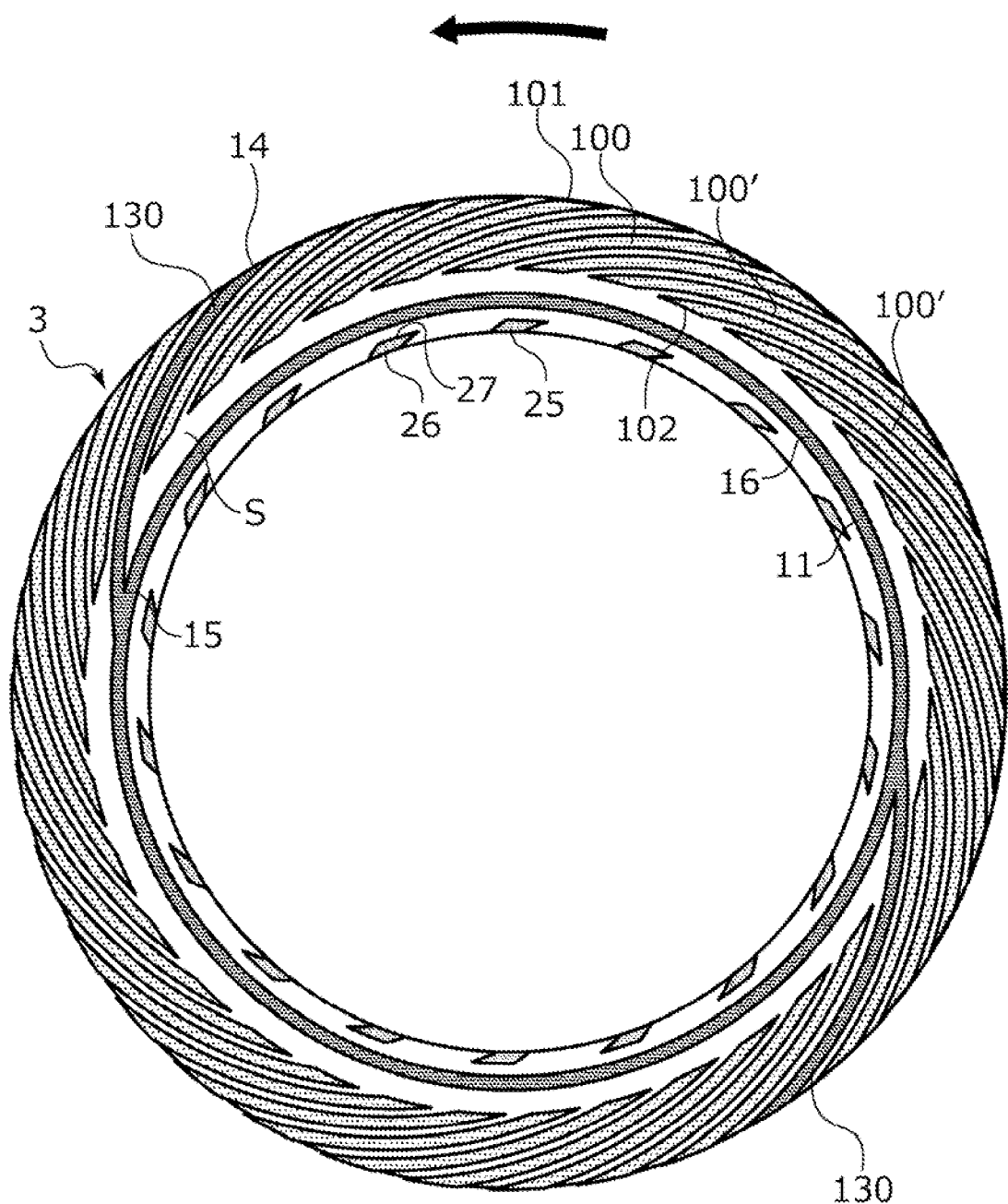
FIG. 11 is a diagram in which a stationary seal ring of a second modified example in the fourth embodiment is viewed from a sliding surface side.

FIG. 11 shows a second modified example of the sliding components according to the fourth embodiment and the negative pressure generation groove 25 which opens to be communicable with the space on the inner peripheral side (the low-pressure fluid side) and is separated from the storage groove 16 is formed on the inner peripheral side (the low-pressure fluid side) in relation to the storage groove 16. The negative pressure generation groove 25 is a shallow groove which is formed to be shorter and deeper than the dynamic pressure generation groove 100. Accordingly, since a negative pressure is generated in the end point 27 on the side of the storage groove 16 of the negative pressure generation groove 25 and the vicinity thereof during rotation of the rotating machine and a fluid in the vicinity thereof is drawn to the negative pressure generation groove 25 and is discharged to the space on the inner peripheral side, it is possible to prevent a fluid of the space on the inner peripheral side from entering the sliding surface.

Although the embodiments of the present invention have been described above with reference to the drawings, the detailed configuration is not limited to these embodiments.

Figure 12:
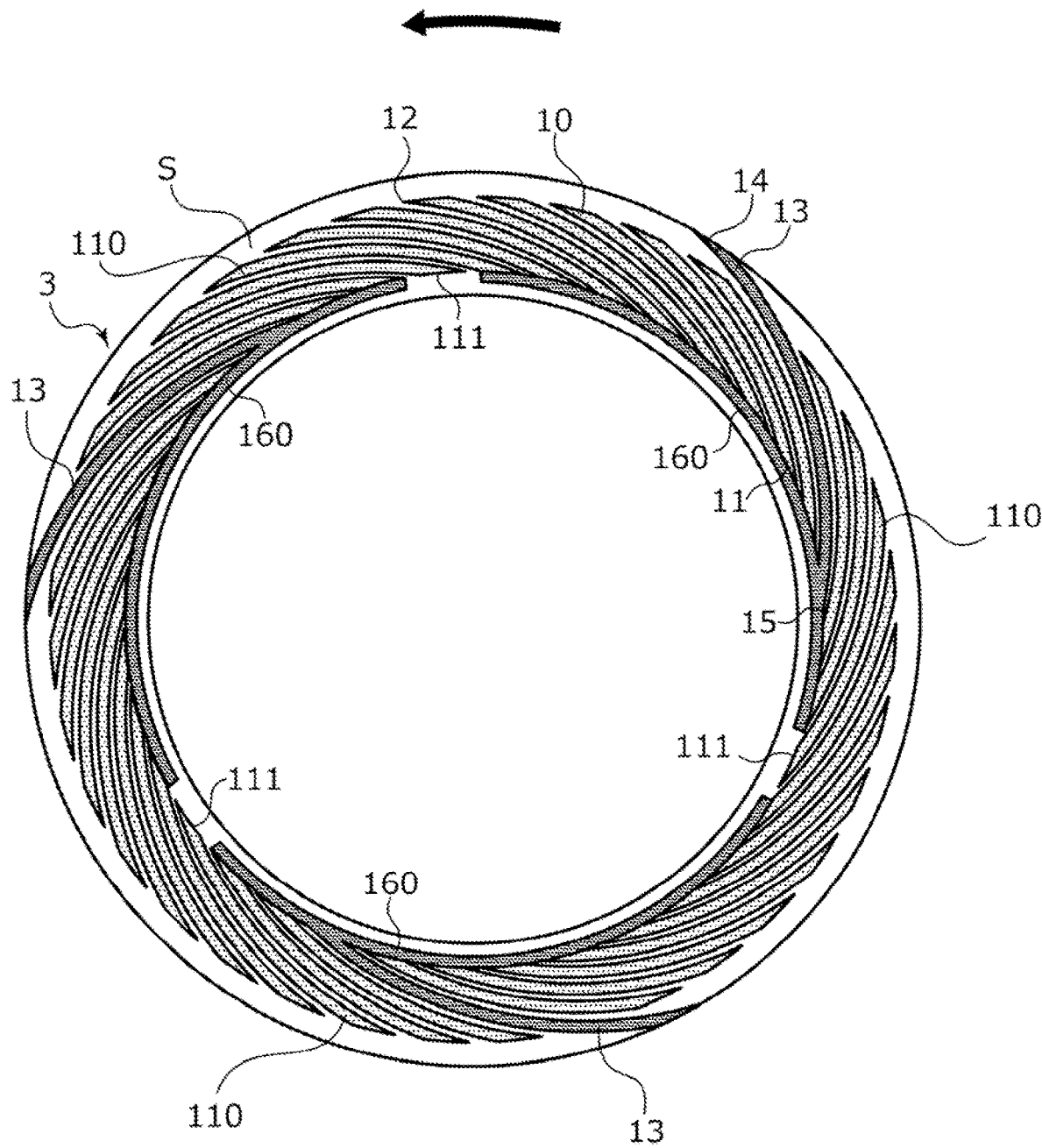
FIG. 12 is a diagram in which a stationary seal ring of a third modified example is viewed from a sliding surface side.

Further, as in a third modified example illustrated in FIG. 12, in each of the embodiments and the modified examples, the storage groove is not limited to the endless annular shape and may be divided into a plurality of parts in the circumferential direction. In this case, it is preferable that the communication groove 13 communicate with each storage groove 160. Further, it is preferable that one or more dynamic pressure generation grooves 10 communicate with each storage groove 160. Additionally, as illustrated in FIG. 12, a start point 111 of a dynamic pressure generation groove 110 between the adjacent storage grooves 160 may not communicate with the storage groove 160.

Figure 13:
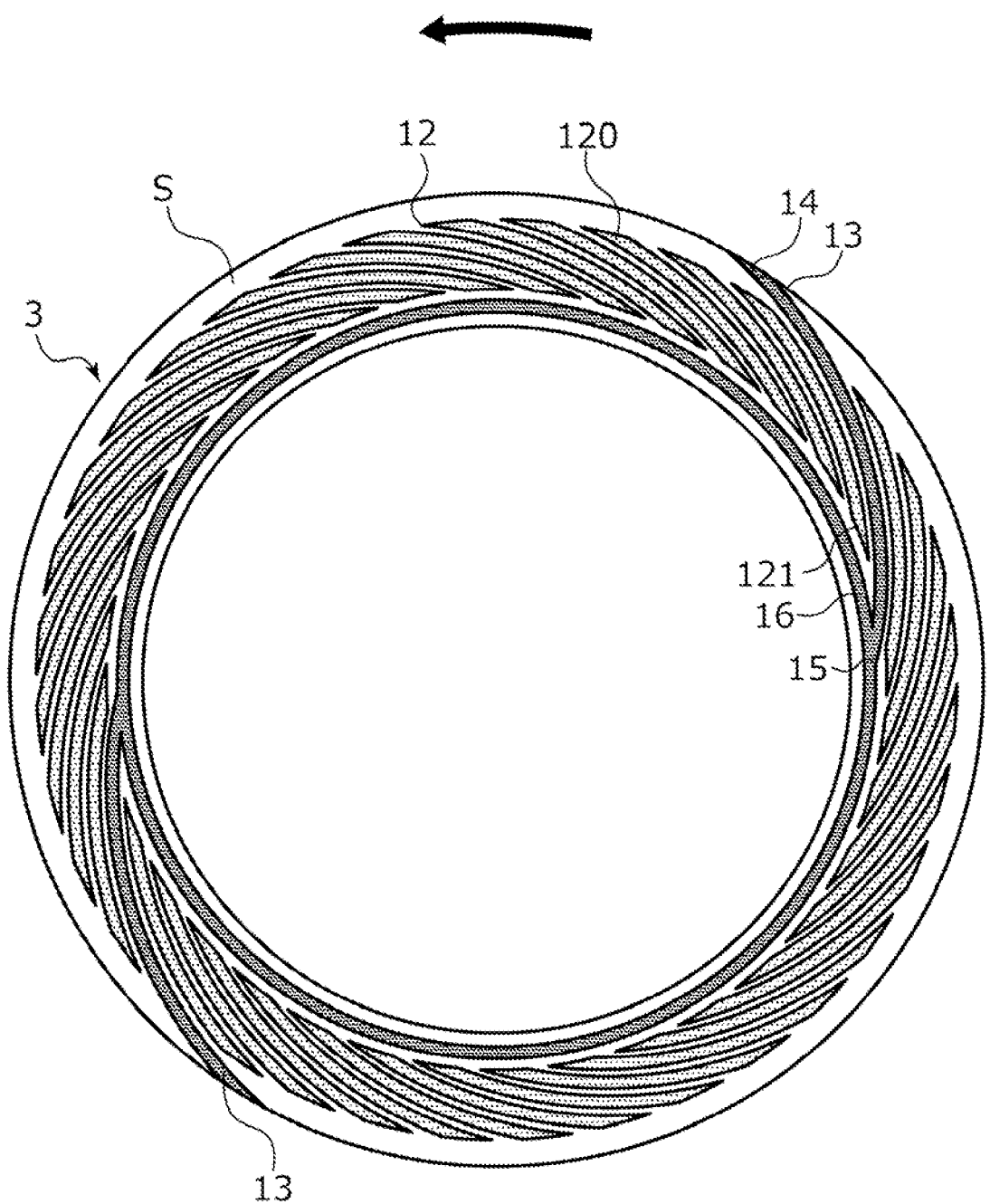
FIG. 13 is a diagram in which a stationary seal ring of a fourth modified example is viewed from a sliding surface side.

Further, as in a fourth modified example illustrated in FIG. 13, in each of the embodiments and the modified examples, a start point 112 of a dynamic pressure generation groove 120 may be slightly separated from the storage groove 16 in the radial direction. Also in this case, the low-pressure fluid can be drawn to the dynamic pressure generation groove 120 over the land portion between the start point 121 of the dynamic pressure generation groove 120 and the storage groove 16 due to the negative pressure generated at the start point 121 of the dynamic pressure generation groove 100 during high-speed rotation. Additionally, a part of the dynamic pressure generation groove may be slightly separated from the storage groove in the radial direction and the other dynamic pressure generation grooves may communicate with the storage groove.

Figure 14:
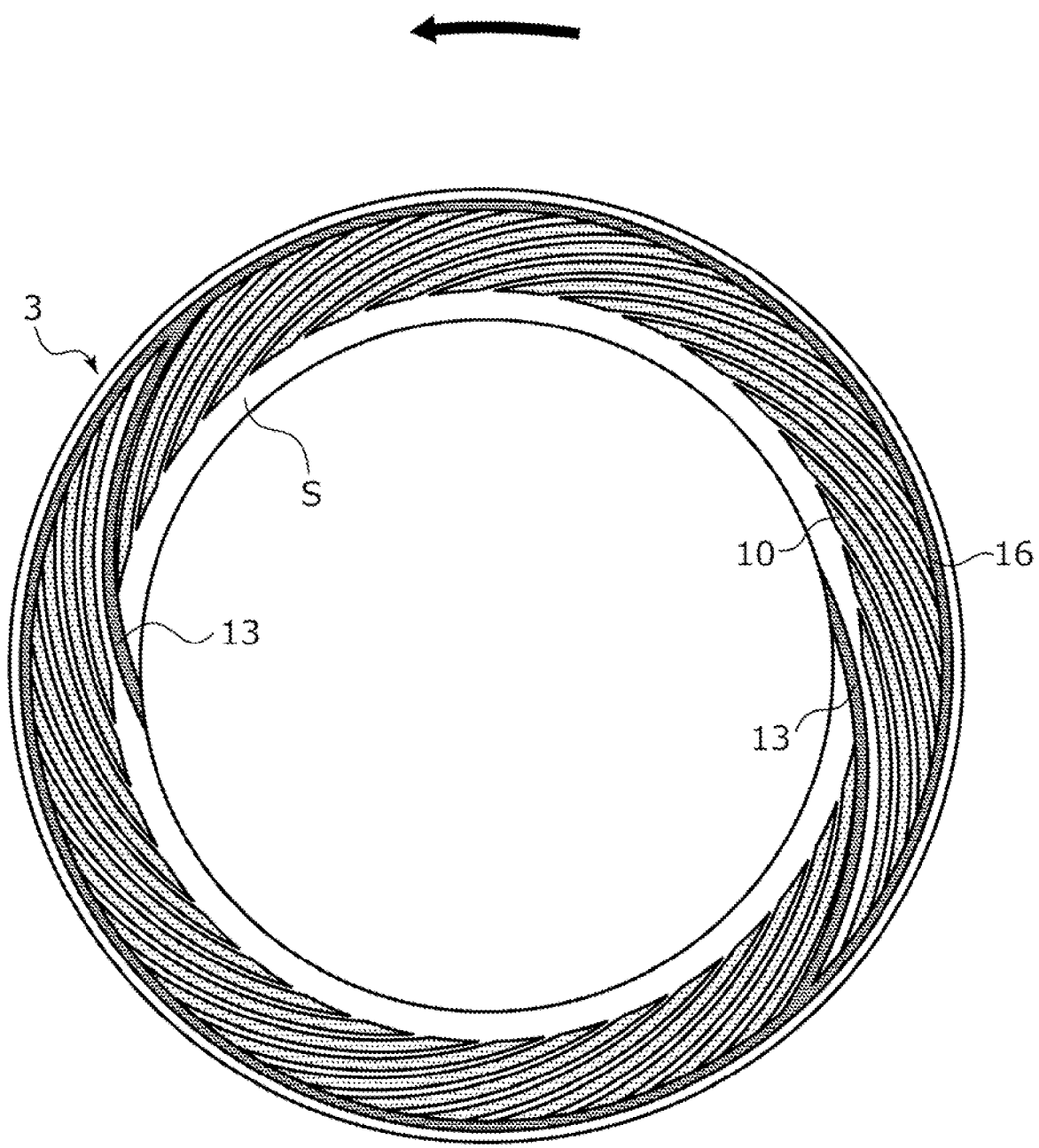
FIG. 14 is a diagram in which a stationary seal ring of a fifth modified example is viewed from a sliding surface side.

Further, as in the fifth modified example illustrated in FIG. 14, a case in which the mechanical seal including the rotary seal ring 3 corresponding to the sliding component of each embodiment is of an inside type has been described as an example, but the mechanical seal may be of an outside type that seals a fluid leaking from the inner periphery toward the outer periphery of the sliding surface S.

REFERENCE SIGNS LIST

1 Rotation shaft
2 Sleeve
3 Rotary seal ring
4 Housing
5 Seal cover
6 Stationary seal ring
7 Urging means
10 Dynamic pressure generation groove
11 Start point
12 End point
13 Communication groove
14 Start point
15 End point
16 Storage groove
20 Specific dynamic pressure generation groove
21 End point
23 Negative pressure generation groove
25 Negative pressure generation groove
100 Dynamic pressure generation groove
110 Dynamic pressure generation groove
120 Dynamic pressure generation groove
111 Start point
130 Communication groove
160 Storage groove
S Sliding surface

The invention claimed is:

1. Sliding components formed in an annular shape and disposed at a relatively rotating part of a rotating machine, one of an inner diameter side space and an outer diameter side space of the sliding components being a sealed fluid side space in which a sealed fluid exists, remaining one of the inner diameter side space and the outer diameter side space being a leakage side space into which the sealed fluid is prevented from leaking,
   wherein a sliding surface of one of the sliding components is provided with a plurality of communication groove each having a start point communicating with the sealed fluid side space in a radial direction, a storage groove communicating with the communication grooves, and a plurality of dynamic pressure generation grooves configured for generating a dynamic pressure at end points thereof upon a run of the rotating machine,
   wherein the dynamic pressure generation grooves are located on a side of the sealed fluid side space with respect to the storage groove in the radial direction,
   wherein all of the communication grooves communicate directly with the storage groove and the sealed fluid side space, and
   wherein each of the dynamic pressure generation grooves extends from a side of the storage groove toward the sealed fluid side space and toward a downstream side of a flow of the sealed fluid on the sliding surface in a circumferential direction.

2. The sliding components according to claim 1,
   wherein the storage groove is formed in an endless annular shape in a circumferential direction of the sliding surface.

3. The sliding components according to claim 1,
   wherein a plurality of the communication grooves are arranged in the circumferential direction of the sliding surface.

4. The sliding components according to claim 1,
   wherein the communication groove and the dynamic pressure generation grooves have a curved shape which is inclined in a same direction.

5. The sliding components according to claim 1,
   wherein the communication groove is configured for discharging the sealed fluid inside the communication groove toward the start point of the communication groove upon the run of the rotating machine.

6. The sliding components according to claim 1,
   wherein the storage groove communicates with start points of the dynamic pressure generation grooves.

7. The sliding components according to claim 1,
   wherein the sliding surface is further provided with a specific dynamic pressure generation groove communicating with a side of the start point of the communication groove in relation to start points of the dynamic pressure generation grooves configured for generating the dynamic pressure upon the run of the rotating machine.

8. The sliding components according to claim 1,
   wherein the sliding components constitutes an inside type mechanical seal that seals a leakage of the sealed fluid in an inner radial direction.

9. The sliding components according toclaim 1,
   wherein one of the sliding components having the sliding surface provided with the dynamic pressure generation grooves, the communication groove, and the storage groove is fixed to a rotation side member of the rotating machine.

10. The sliding components according to claim 2,
wherein a plurality of the communication grooves are arranged in the circumferential direction of the sliding surface.

11. The sliding components according to claim 2,
wherein the communication groove and the dynamic pressure generation grooves have a curved shape which is inclined in a same direction.

12. The sliding components according to claim 2,
wherein the communication groove is configured for discharging the sealed fluid inside the communication groove toward the start point of the communication groove upon the run of the rotating machine.

13. The sliding components according to claim 2,
wherein the storage groove communicates with start points of the dynamic pressure generation grooves.

14. The sliding components according to claim 2,
wherein the sliding surface is further provided with a specific dynamic pressure generation groove communicating with a side of the start point of the communication groove in relation to start points of the dynamic pressure generation grooves configured for generating the dynamic pressure upon the run of the rotating machine.

15. The sliding components according to claim 2,
wherein the sliding components constitutes an inside type mechanical seal that seals a leakage of the sealed fluid in an inner radial direction.

16. The sliding components according to claim 2,
wherein one of the sliding components having the sliding surface provided with the dynamic pressure generation grooves, the communication groove, and the storage groove is fixed to a rotation side member of the rotating machine.

17. The sliding components according to claim 3,
wherein the communication groove and the dynamic pressure generation grooves have a curved shape which is inclined in a same direction.

18. The sliding components according to claim 3,
wherein the communication groove is configured for discharging the sealed fluid inside the communication groove toward the start point of the communication groove upon the run of the rotating machine.

19. The sliding components according to claim 3,
wherein the storage groove communicates with start points of the dynamic pressure generation grooves.

20. The sliding components according to claim 3,
wherein the sliding surface is further provided with a specific dynamic pressure generation groove communicating with a side of the start point of the communication groove in relation to start points of the dynamic pressure generation grooves configured for generating the dynamic pressure upon the run of the rotating machine.

21. Sliding components formed in an annular shape and disposed at a relatively rotating part of a rotating machine, one of an inner diameter side space and an outer diameter side space of the sliding components being a sealed fluid side space in which a sealed fluid exists, remaining one of the inner diameter side space and the outer diameter side space being a leakage side space into which the sealed fluid is prevented from leaking, wherein a sliding surface of one of the sliding components is provided with a plurality of communication grooves each having a start point communicating with the sealed fluid side space in a radial direction, an end point communicating with a storage groove, and a plurality of dynamic pressure generation grooves configured for generating a dynamic pressure at end points thereof upon a run of the rotating machine, wherein the dynamic pressure generation grooves are located on a side of the sealed fluid side space with respect to the storage groove in the radial direction, wherein the communication groove and the dynamic pressure generation groove adjacent to each other in a circumferential direction are isolated from each other by a land portion, wherein each of the dynamic pressure generation grooves extends from the sealed fluid side space toward a side of the storage groove and toward a downstream side of a flow of the sealed fluid on the sliding surface in a circumferential direction, and wherein the dynamic pressure generation grooves are larger in number than the communication grooves.

22. The sliding components according to claim 21,
wherein the communication groove and the dynamic pressure generation grooves have a curved shape which is inclined in a same direction.

23. The sliding components according to claim 21,
wherein the sliding surface of one of the sliding components is provided with a negative pressure generation groove which is located on the leakage side space with respect to the storage groove and which communicates with the storage groove.

* * * * *